(12) United States Patent
Makino

(10) Patent No.: US 8,049,932 B2
(45) Date of Patent: Nov. 1, 2011

(54) IMAGE FORMING APPARATUS AND IMAGE DENSITY CONTROL METHOD THEREFOR

(75) Inventor: Masahiro Makino, Toride (JP)

(73) Assignee: Canon Kabushiki Kaisha (JP)

( * ) Notice: Subject to any disclaimer, the term of this patent is extended or adjusted under 35 U.S.C. 154(b) by 622 days.

(21) Appl. No.: 12/184,479

(22) Filed: Aug. 1, 2008

(65) Prior Publication Data

US 2009/0034003 A1    Feb. 5, 2009

(30) Foreign Application Priority Data

Aug. 2, 2007    (JP) ................................ 2007-201951

(51) Int. Cl.
*H04N 1/405*    (2006.01)
(52) U.S. Cl. ........................................ 358/3.1; 358/519
(58) Field of Classification Search ............ 358/1.7–1.9, 358/2.1, 3.1–3.12, 3.24, 1.16, 519, 516, 522, 358/529
See application file for complete search history.

(56) References Cited

U.S. PATENT DOCUMENTS 5,455,657 A * 10/1995 Takeda ............................ 399/37
7,088,929 B2 * 8/2006 Ahn ................................ 399/27
2007/0134012 A1 * 6/2007 Suzuki et al. .................... 399/49

FOREIGN PATENT DOCUMENTS

| JP | 8-156330 A | 6/1996 |
| JP | 2000-238341 A | 9/2000 |
| JP | 2001-343794 A | 12/2001 |
| JP | 2005-131965 A | 5/2008 |

* cited by examiner

*Primary Examiner* — Thomas D Lee
*Assistant Examiner* — Stephen M Brinich
(74) *Attorney, Agent, or Firm* — Rossi, Kimms & McDowell LLP

(57) ABSTRACT

An image forming apparatus which having a plurality of image processing modes, that is capable of accurate density gradation control without performing output of any patch image to a recording medium in all the image processing modes. A first correction parameter corresponding to a first image processing mode is prepared on the basis of a result of detection, by a second density detection unit, of the image formed on a recording medium in a first image processing mode. A second correction parameter corresponding to a second image processing mode is prepared on the basis of the first correction parameter and a correlation, stored in a storage unit in advance, between density of a toner image formed on an image bearing member in the first image processing mode and density of toner image formed on the image bearing member in the second image processing mode.

12 Claims, 17 Drawing Sheets

IMAGE FORMING APPARATUS AND IMAGE DENSITY CONTROL METHOD THEREFOR

BACKGROUND OF THE INVENTION

1. Field of the Invention

The present invention relates to an image forming apparatus which forms an image on a recording medium by using an electrophotographic printing method or the like and to a image density control method therefor.

2. Description of the Related Art

In recent years, there has been an increasing demand for improving the image quality and stability of image forming apparatuses. As a result of an effort to improve the image quality, in image forming apparatuses, a plurality of image forming modes have been provided. In such image forming apparatuses, an image is formed in a mode suitable for characters or in a mode suitable for photographs by changing lines, dots, or the definition (the number of lines per inch) of the image to be formed. Expressions of images are thus enriched to meet various user needs in the market.

One of consideration items to which prime importance is attached in a stability improving scheme is density gradation stability. In particular, output densities of an image forming apparatus vary due to environmental changes, changes with time and the like. There is, therefore, a demand for the provision of a density control sequence for maintaining correct density gradations of the image at all times.

In conventional image forming apparatuses, therefore, correction parameters (e.g., a lookup table: LUT) are set such that proper relationships are maintained between input image densities and output image densities. Input image data is corrected on the basis of a LUT to maintain proper relationships between input image densities and output image densities.

The LUT is obtained, for example, by reading the optical density of an image pattern formed on a recording medium such as recording paper or an image pattern formed on an image bearing member such as a photosensitive drum. In a case where a high-quality output image is required, it is desirable to perform density gradation control using a recording medium. Also, it is desirable to perform density gradation control with respect to each of a plurality of image processing modes in order to obtain high-quality images in the plurality of image processing modes.

An image forming apparatus which performs gradation correction without forming gradation patterns on an image bearing member in all image processing modes (see Japanese Laid-Open Patent Publication (Kokai) No. 08-156330) has been proposed. This image forming apparatus functionizes the correlations between input/output characteristics (γ-characteristics) for the image processing modes or patternizes the correlations. Then, on the basis of a gradation pattern formed on the image bearing member in one of the image processing modes and the functionized or patternized correlations, the image forming apparatus performs density gradation control uniquely in another of the image processing modes.

As described above, the image forming apparatus described in Japanese Laid-Open Patent Publication (Kokai) No. 08-156330 is disclosed with respect to gradation control using an image bearing member. However, a method of comparing the density of a gradation pattern actually printed on a recording medium with the desired density and performing gradation control on the basis of the comparison result enables gradation control with higher accuracy than the method described in Japanese Laid-Open Patent Publication (Kokai) No. 08-156330.

This density gradation control using a recording medium is performed by a user moving the recording medium output from the image forming apparatus to a reader and making the reader read the recording medium at the time of execution of density gradation control. However, a heavy burden would be put on the user if density gradation control using a recording medium needs to be performed with respect to all the plurality of image processing modes that the user may use.

SUMMARY OF THE INVENTION

The present invention provides an image forming apparatus, having a plurality of image processing modes, capable of accurate density gradation control without performing output of any patch image to a recording medium in all the image processing modes and an image density control method therefor.

In a first aspect of the present invention, there is provided with an image forming apparatus comprising an image bearing member, an image forming apparatus comprising an image processing unit having a first image processing mode and a second image processing mode different from the first image processing mode, the image processing unit processes an image data by the first image processing mode or the second image processing mode, a image forming unit adapted to form a toner image on an image bearing member and form an image on a recording medium by transferring the toner image on the image bearing member on the basis of the image data processed by the image processing unit, a density detection unit adapted to detect a density of the image formed on a recording medium, a storage unit adapted to store in advance a correlation between a density of the image on the recording medium on the basis of the image data processed by the first image processing mode and a density of the image on a recording medium on the basis of the image data processed by the second image processing mode, a controller adapted to obtain a first correction parameter to correct a density of an image obtained by the first image processing mode on the basis of a result of the detection of the density detection unit and obtain a second correction parameter to correct a density of an image obtained by the second image processing mode on the basis of the first correction parameter and the correlation.

According to the present invention, a phenomenon in which the output characteristics of an image bearing member density detection unit have a correlation between a plurality of image processing modes (the first image processing mode and the second image processing mode) is utilized. An image pattern is first prepared on the recording medium in the first image processing mode, and the optical density of the image pattern is read with a reader unit for reading an original on the image forming apparatus. A first correction parameter corresponding to the first image processing mode is thereby prepared. A second correction parameter corresponding to the second image processing mode is prepared on the basis of the first correction parameter and the correlation between the density of a patch image formed on the image bearing member in the first image processing mode and the density of a patch image formed on the image bearing member in the second image forming mode. In this way, accurate density gradation control is enabled without performing patch image output to the recording medium in the second image forming mode, thus reducing the burden put on a user.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

In the following description of the embodiments, an image forming apparatus is illustrated in which toner images in different colors are successively transferred onto an intermediate transfer member by being superposed one on another and the toner images borne on the intermediate transfer member are transferred onto a recording medium at a time. However, the image forming apparatus of the present invention is not limited to this type of image forming apparatus. The present invention includes an image forming apparatus in which toner images in different colors are successively transferred onto a recording medium borne on a recording medium bearing member by being superposed one on another. While a copying machine is illustrated as one form of the image forming apparatus in the following description, the present invention is not limited to the copying machine. For example, the image forming apparatus may be any of other kinds of image forming apparatus such as a printer or a facsimile, or a multifunction printer having a combination of the functions thereof. Also, the shapes and the relative placements of component parts of the embodiments described below should be suitably changed according to the construction of the apparatus to which the present invention is applied and various conditions, and below-described illustrated examples thereof do not limit the scope of the present invention.

(Outline of Construction of Image Forming Apparatus)

Figure 1:
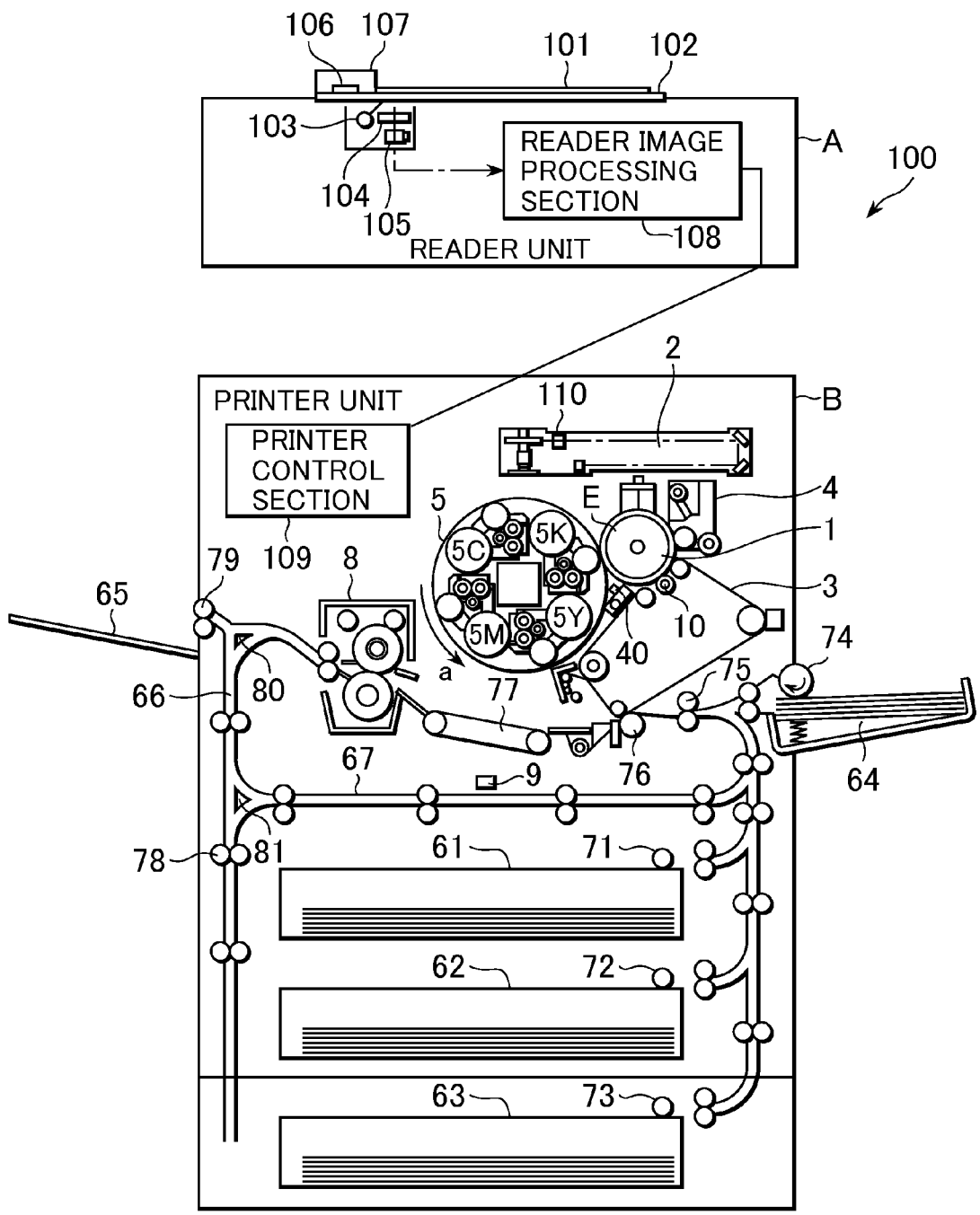
FIG. 1 is a view schematically showing the construction of a multicolor copying machine which is an image forming apparatus according to an embodiment of the present invention.

FIG. 1 is a view schematically showing the construction of a multicolor copying machine which is an image forming apparatus according to an embodiment of the present invention. Referring to FIG. 1, the multicolor copying machine (image forming apparatus) 100 comprises a reader unit A which reads an original, and a printer unit B which outputs by an electrophotographic printing method the original read by the reader unit A.

(Construction of the Reader Unit A)

An original 101 placed on a platen glass 102 of the reader unit A is illuminated with a light source 103. Reflected light from the original 101 is focused on an image pickup device (CCD sensor in this embodiment) 105 through an optical system 104 to form an image. For example, the CCD sensor 105 is constituted by CCD line sensors arranged in three rows. The CCD line sensors respectively produce color component signals of red, green and blue colors of reflected light. Thus, the reader unit A obtains color component signals of the three colors. The light source 103, the optical system 104 and the CCD sensor 105 move as a reading optical system unit in the direction of the arrow shown in FIG. 1 (sub-scanning direction) to successively convert the images of the original 101 into electrical signals (image signals) on a line-by-line basis.

A positioning member 107 and a reference white plate 106 are disposed on the periphery of the platen glass 102. One side of the original 101 is brought into contact with the positioning member 107 to prevent oblique placement of the original 101. The reference white plate 106 is for determining a white level and making shading correction in the thrust direction of the CCD sensor 105.

Image signals obtained line by line by the CCD sensor 105 undergo image processing in a reader image processing section 108 and are thereafter sent to the printer unit B to be processed in a printer control section 109 described below.

Figure 2:
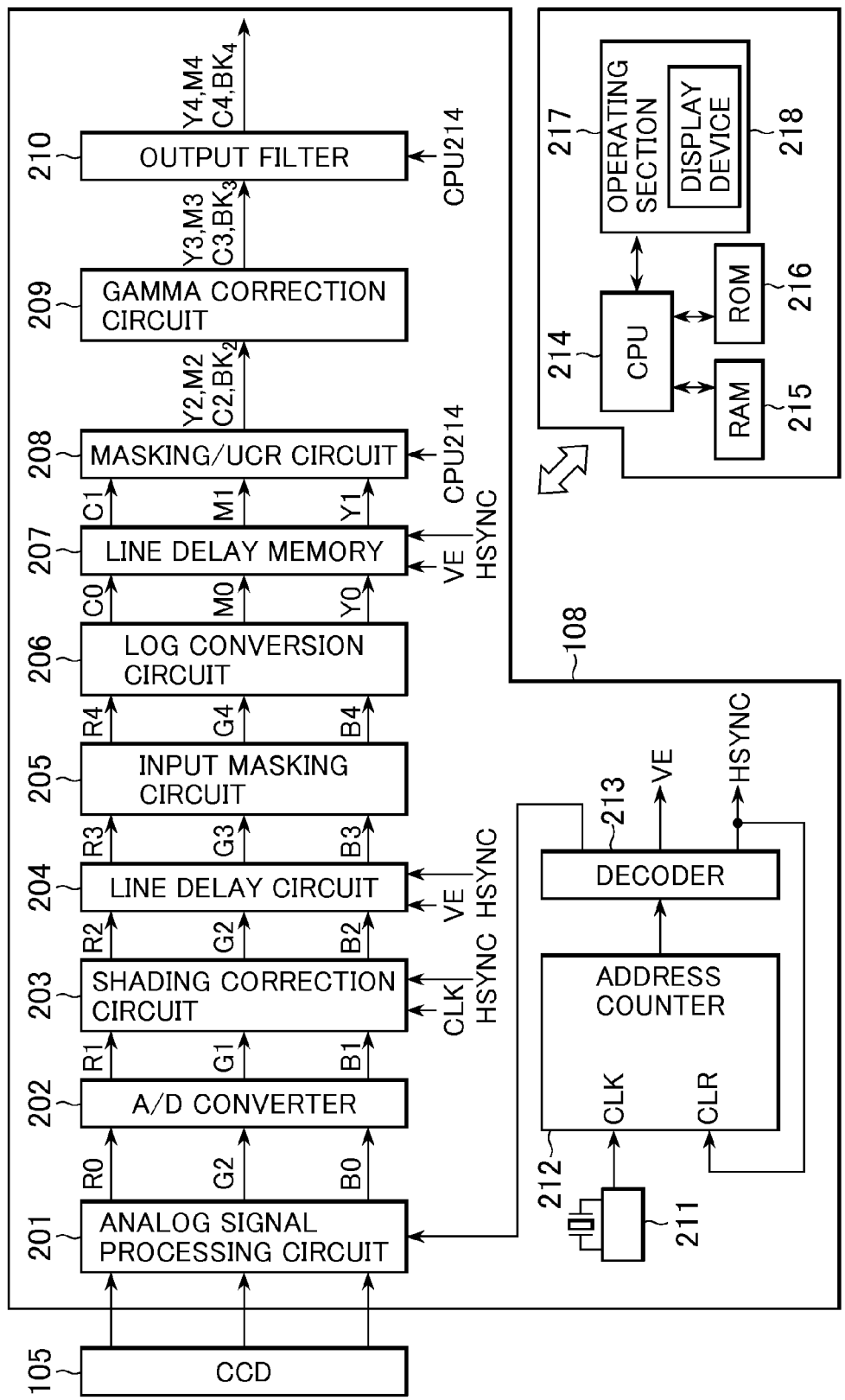
FIG. 2 is a block diagram showing the configuration of a reader image processing section shown in FIG. 1.

FIG. 2 is a block diagram showing the configuration of the reader processing section 108 shown in FIG. 1. Image signals R, G, and B output from the CCD sensor 105 are input to an analog signal processing circuit 201, gain- and offset-adjusted, and thereafter converted into 8-bit digital image signals R1, G1, and B1 corresponding to the colors by an A/D converter 202. The image signals R1, G1, and B1 are input to a shading correction circuit 203, for undergoing well-known shading correction using a read signal from the reference white plate 106 with respect to each color in the shading correction circuit 203, and are output as image signals R2, G2, and B2.

A clock generation circuit 211 generates clock pulses CLK on a pixel-by-pixel basis. An address counter 212 counts clock pulses CLK, produces a main scanning address signal with respect to each line and outputs the main scanning address signal. A decoder 213 decodes the main scanning address signal and produces a CCD drive signal such as a shift pulse or a reset pulse with respect to each line, a signal VE representing an effective region in the image signals for each line output from the CCD sensor 105, and a line sync signal HSYNC. The address counter 212 is cleared by the line sync signal HSYNC to start counting for the main scanning address for the next line.

The line sensors constituting the CCD sensor 105 are disposed at a predetermined distance from each other in the sub-scanning direction. The spatial misalignments (position misalignment) in the sub-scanning direction between the line sensors are corrected by a line delay circuit 204. More specifically, for example, the signals R and G are line-delayed in the sub-scanning direction with respect to the signal B to enable signals R3, G3, and B3 to be obtained from the signals R, G, and B obtained by reading one of the original.

An input masking circuit 205 converts a color space (read color space) of the image signals determined by the spectroscopic characteristics of R, G and B filters used on the respective line sensors in the CCD sensor 105 into a predetermined color space by matrix computation, and outputs the computation results as image signals R4, G4, and B4. The predetermined color space is, for example, the sRGB or NTSC standard color space.

A LOG conversion circuit 206 is constituted by a lookup table (LUT) ROM. The LOG conversion circuit 206 converts the image signals R4, G4, and B4 (luminance signals) from the input masking circuit 205 into density signals C0, M0, and Y0.

A line delay memory 207 delays the image signals C0, M0, and Y0 by a line delay amount indicating a time period from generating determination signals, e.g., for UCR (under color removal), FILTER and SEN from the image signals R4, G4, and B4 performed by a black character determination section (not shown) to outputting them therefrom. The line delay memory 207 outputs three primary color signals C1, M1, and Y1.

A masking/UCR circuit 208 extracts a black signal Bk from the three primary color signals Y1, M1, and C1 input thereto. A masking/UCR circuit 208 further performs computation for correcting color turbidity on a recording medium in the printer unit B and successively outputs image signals Y2, M2, C2, and Bk2 with a predetermined bit width (e.g., 8 bits) each time a read is performed.

A gamma correction circuit 209 performs density correction on the image signals (input signals) so that the output from the printer unit B conforms to an ideal gradation characteristic. Density correction on the image signals is performed with respect to each of image forming modes. The image forming apparatus 100 has four image processing modes: a character mode (SCA), a printed photograph mode (SCB), a photographic paper photograph mode (SCC) and a map mode (SCD). The number of lines per inch (lpi), the screen angle, dot growth and line growth are set these image forming modes are set for each of these image forming modes by differentiating therebetween so that a most suitable output image is obtained in the image processing mode.

An output filter 210 performs edge enhancement or smoothing processing on the image signals. Plane-sequential image signals M4, C4, Y4, and Bk obtained by these processings are sent to the printer control section 109 in the printer unit B to be converted into pulse-width-modulated pulse signals. Density recording is performed on the basis of these signals.

Referring to FIG. 2, a CPU 214 performs control and image processing in components in the reader unit A including the reader image processing section 108 according to programs stored in a read-only memory (ROM) 216 by using a random-access memory (RAM) 215 as a work memory. An operating section 217 is, for example, a user interface provided in the reader unit A. An operator inputs a command and processing condition to the CPU 214 by operating the operating section 217. A display device 218 displays the operating condition of the entire image forming apparatus 100 including the reader unit A and the printer unit B and set processing conditions.

(Construction of the Printer Unit B)

As shown in FIG. 1, the printer unit B has an image forming section including an electrophotographic photosensitive material drum (hereinafter referred to as "photosensitive drum") 1 provided as an image bearing member rotating at a constant speed, and a transport section arranged to transport the recording medium to the image forming section, and transport the recording medium after an image is formed in the image forming section.

In the image forming section, as shown in FIG. 1, a pre-exposure lamp 6 (not shown) which pre-expose the photosensitive drum 1, a charger 7 (not shown) for uniformly charging the surface of the photosensitive drum 1, and a laser exposure optical system 2 for forming a latent image on the photosensitive drum 1 are disposed around the photosensitive drum 1. There are also disposed a rotary development unit 5 which develops a latent image on the photosensitive drum 1 as a toner image by attaching toner to the latent image and a photosensor 40 (described below) of FIG. 5 which reads the optical density of the toner image on the photosensitive drum 1. The photosensor 40 corresponds to the image bearing member density detection unit. The photosensor 40 is thus provided in the image forming section in the image forming apparatus 100 to enable reading of the optical density of a toner image immediately after forming of the toner image. There are also disposed an intermediate transfer member 3 onto which toner images formed on the photosensitive drum 1 are successively transferred and, on which the toner images are borne, a cleaning device 4 for removing transfer residual toner remaining on the surface of the photosensitive drum 1 after transfer, and other components.

The photosensor 40 also detects a patch image formed on the photosensitive drum 1 for control of density gradation. In the image forming apparatus 100 in the present embodiment, the photosensor 40 is provided at a location opposed to the photosensitive drum 1. However, the present embodiment is not limited to this. The photosensor 40 may be provided at a location opposed to the intermediate transfer member 3 for the purpose of detecting a patch image formed on the intermediate transfer member 3.

The rotary development unit 5 capable of rotating has a development device 5K for development of black, a development device 5Y for development of yellow, a development device 5M for development of magenta, and a development device 5C for development of cyan. The rotary development unit 5 is capable of rotating in the direction of arrow a in the figure on a cylindrical rotating shaft provided at a center of the rotary development unit 5 and moving desired one of the development devices 5K, 5Y, 5M, and 5C to a development position opposed to the photosensitive drum 1 when development of the corresponding color is required.

When an image is formed, the photosensitive drum 1 is rotated and, pre-exposed by the pre-exposure lamp 6 and thereafter charged uniformly by the charger 7, and a light image E of the first color is applied to the photosensitive drum 1 by the laser exposure optical system 2 to form a latent image on the photosensitive drum 1. Subsequently, the latent image on the photosensitive drum 1 is developed by the first-color development device to form a toner image on a base material formed of a resin and a pigment on the photosensitive drum 1. Thereafter, the toner image formed on the photosensitive drum 1 is transferred onto the intermediate transfer member 3 by primary transfer performed by a transfer section 10.

After the completion of development of the first color, the rotary development unit 5 rotates through 90° in the direction of arrow a in the drawing to move the second-color development device to the development position at which the development device is opposed to the photosensitive drum 1. After the completion of primary transfer of the first color, the photosensitive drum 1 is cleaned by the cleaning device 4. Latent image forming, development and primary transfer are repeatedly performed with respect to the second, third and fourth colors in the same manner as those performed on the first color, thereby successively superposing toner images of the colors on the intermediate transfer member 3.

In the transport section for transporting the recording medium to the image forming section and transporting the recording medium after image forming in the image forming section, recording medium sheets stored in the storage sections 61, 62, 63, and 64 are selectively fed one by one by feed rollers 71, 72, 73, and 74. In the transport section, a skew of the recording medium is corrected by means of registration rollers 75 and the recording medium is thereafter transported to a secondary transfer section 76 by the desired timing. The toner images transferred onto the intermediate transfer member 3 in a superposed state are collectively transferred (secondary-transferred) onto the recording medium transported into the secondary transfer section 76. The recording medium onto which the toner images have been transferred by the secondary transfer section 76 passes through a transport section 77, thus the toner image on the recording medium is fixed by a fixing device 8 and thereafter the recording medium is discharged onto a discharge tray 65 by discharge rollers 79.

In a case where images are formed on the double-side of the recording medium, the recording medium is temporarily introduced into a reversal path 66 by a first switch guide 80 after passing the fixing device 8. By reversed rotation of the reversing rollers 78 capable of rotating in the normal/reverse direction, the recording medium introduced into the reversal path 66 is transported in the direction opposite to the direction in which it has been fed into the reversal path 66, with its trailing end at the time of feeding into the reversal path 66 moved forward as a leading end. The recording medium is thereby transported into a double-side transport path 67 via a second switch guide 81.

The recording medium is again fed into the image forming section by being passed through the double-side transport path 67 and transported to the registration rollers 75. The next image is then transferred onto the other side of the recording medium. The printer control section 109 controls the operations of the above-described sections constituting the image forming apparatus 100.

(Image Processing Operation)

Figure 3:
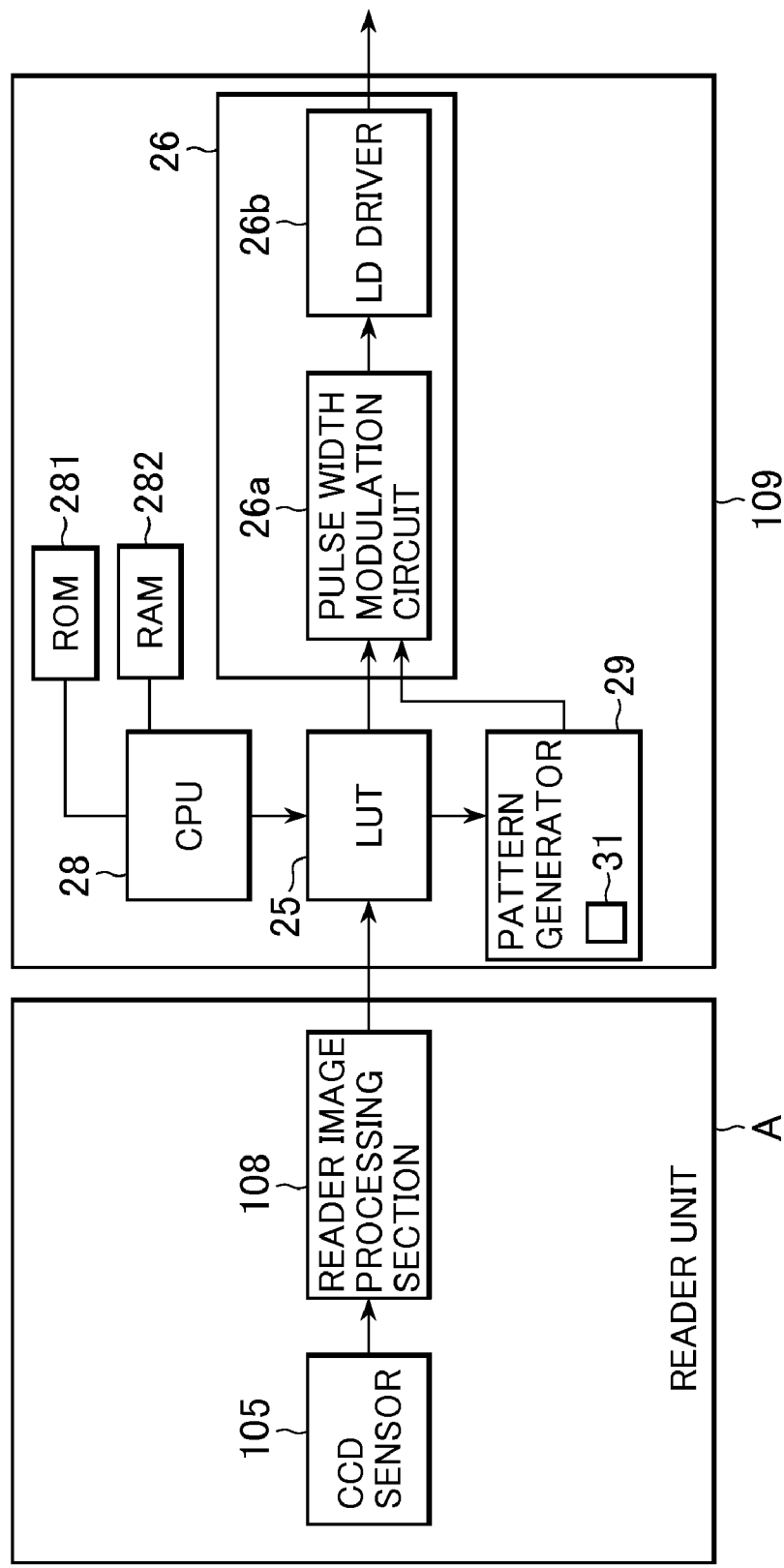
FIG. 3 is a block diagram showing the configuration of a printer control section shown in FIG. 1.

The image processing operation of the printer control section 109 will be further described. FIG. 3 is a block diagram showing the configuration of the printer control section 109 shown in FIG. 1. The printer control section 109 comprises a CPU 28, a LUT 25, a laser driver 26, a ROM 281, a RAM 282 and a pattern generator 29. The above-described CPU 214 is a CPU for the reader unit A, while the CPU 28 is a CPU for the printer unit B. While the CPU 214 and the CPU 28 have been described as different CPUs in the illustrated apparatus, one CPU may control both the reader unit A and the printer unit B. For ease of description below, it is assumed that the reader unit A and the printer unit B are controlled by the CPU 28.

In the reader unit A, as described above, luminance signals R, G, and B of an image obtained by the CCD sensor 105 are converted into plane-sequential density signals C4, M4, Y4, and Bk4 by the reader image processing section 108. The density signals after conversion are corrected by the LUT 25 ($\gamma$-LUT) so that the resulting signals conform to the gamma characteristics ($\gamma$-characteristics) of the printer unit B in the initialized state, that is, the density of the original image coincides with the density of an output image. In the present embodiment, $\gamma$-characteristics are obtained in advance as described, thereby facilitating execution and change of density gradation correction described below.

Figure 4:
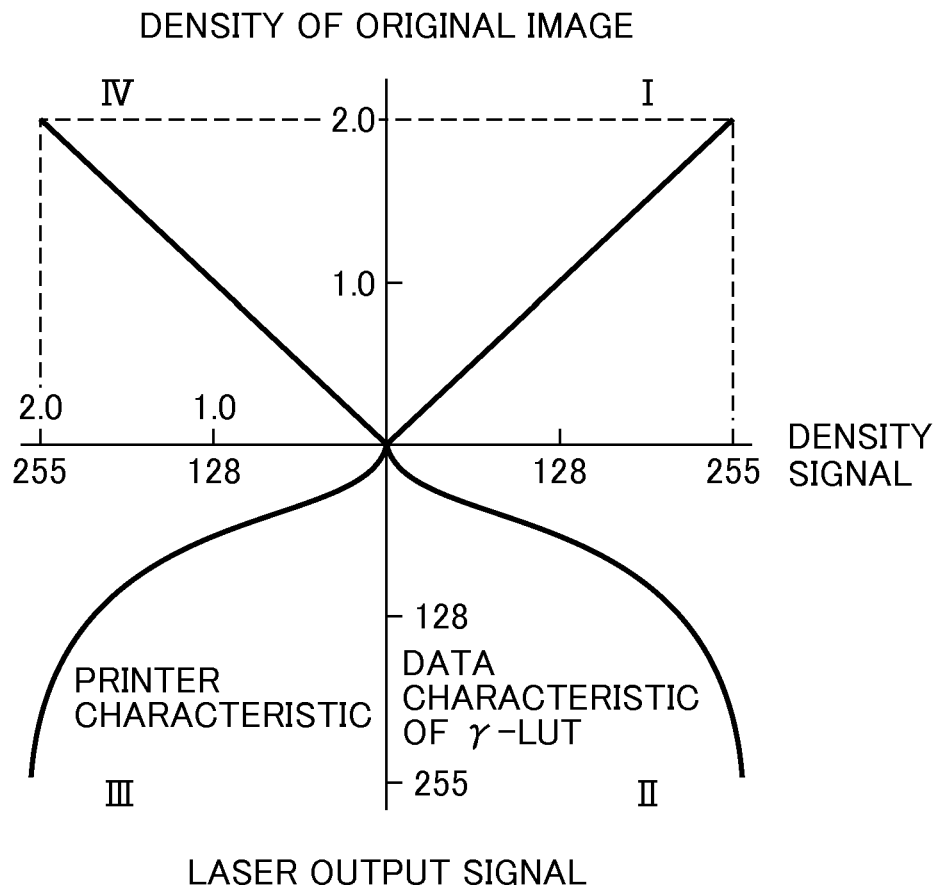
FIG. 4 is a graph in four-quadrant form for description of gradational reproduction of the density of an output image with respect to the density of an original image.

FIG. 4 is a graph in four-quadrant form for description of gradational reproduction of the density of an output image with respect to the density of an original image. In the quadrant I, a reading characteristic of the reader unit A converting the density of the original image into a density signal (an image signal) is shown. In the quadrant II, a conversion characteristic of the LUT 25 for converting the density signal into a laser output signal is shown. In the quadrant III, a recording characteristic (printer characteristic) of the printer unit B converting the laser output signal into the density of the output image is shown. In the quadrant IV, the relationship between the density of the original image and the density of the output image, i.e., a gradation reproduction characteristic (gradation characteristic) of the entire image forming apparatus 100, is shown. FIG. 4 shows a case where the original image density is processed by means of an 8-bit digital signal, that is, the number of gradation steps is 256.

To make linear the gradation reproduction characteristic of the entire image forming apparatus 100, i.e., the gradation characteristic shown in the quadrant IV, the nonlinear printer characteristic shown in the quadrant III is corrected by the characteristic of the LUT 25 shown in the quadrant II. The image signal (image data) in which the gradation characteristic is converted by the LUT 25 is converted into a pulse signal corresponding to the dot width by a pulse width modulation (PWM) circuit 26a of the laser driver 26. This pulse signal is sent to the LD driver 26*b* that performs on/off control on a laser light source 110. In the present embodiment, a method of performing gradation reproduction by pulse width modulation with respect to all the colors Y, M, C, and Bk is used.

An electrostatic latent image gradation-controlled through changes in dot area and having a predetermined gradation characteristic is formed on the photosensitive drum 1 by scanning with laser light output from the laser light source 110. Thus, a gradation image is reproduced by a process including the above-described development, transfer and fixation.

(Photosensor)

Figure 5:
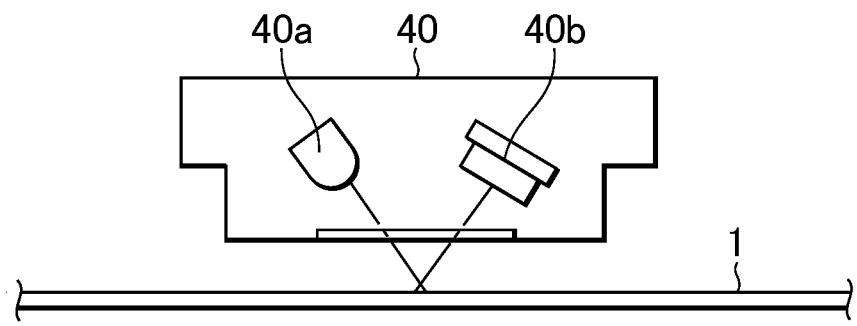
FIG. 5 is a view schematically showing the construction of a photosensor disposed at a location opposed to the surface of the photosensitive drum 1 on which a toner image is formed as shown in FIG. 1.
Figure 6:
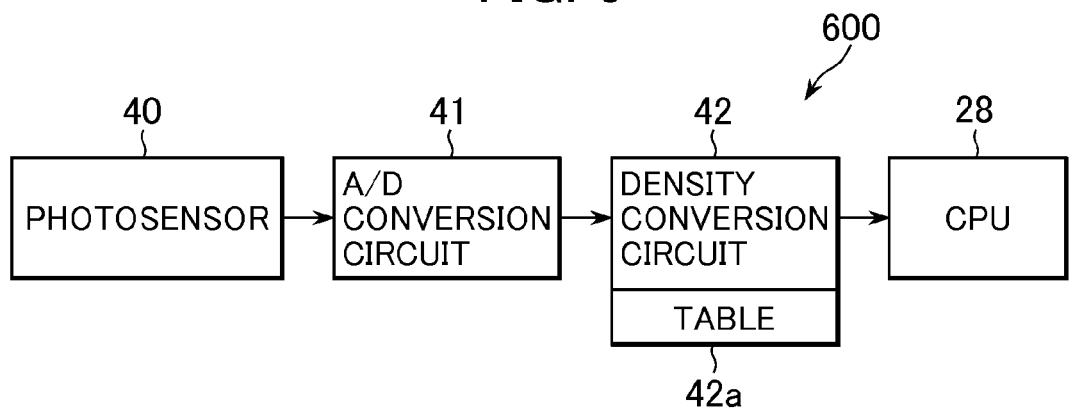
FIG. 6 is a block diagram showing the configuration of the photosensor and a signal processing circuit which processes a signal output from the photosensor.

Description will next be made of the photosensor 40. FIG. 5 is a view schematically showing the construction of the photosensor 40 disposed at a location opposed to the surface of the photosensitive drum 1 as shown in FIG. 1. The photosensor 40 is constituted by a light emitting diode (LED) 40*a* and a photodiode 40*b*. FIG. 6 is a block diagram showing the configuration of the photosensor 40 and a signal processing circuit 600 which processes a signal output from the photosensor 40. In the present embodiment, the signal processing circuit 600 is constituted by an A/D conversion circuit 41, a density conversion circuit 42 and the CPU 28 described below. In the photosensor 40, light emitted from the LED 40*a*, reflected (as near-infrared rays) from the photosensitive drum 1 and input to the photodiode 40*b* is converted into an electrical signal in the range from 0 to 5 V for example to be output. This electrical signal is converted into an 8-bit (0 to 255) digital signal by the A/D conversion circuit 41 and the converted signal is converted into density information by the density conversion circuit 42 having a table 42*a* for converting a digital signal into a density value.

In the present embodiment, the photosensor 40 is constructed to detect only specularly reflected light from the photosensitive drum 1. However, the photosensor 40 may alternatively be of such a type as to use both specularly reflected light and diffusely reflected light. In the image forming apparatus 100, three photosensors 40 are disposed at positions on the periphery of the photosensitive drum 1 by being arranged along the main scanning direction, thereby enabling the image formed on the image bearing member to be detected simultaneously at three points. In this way, reductions in the times required for various kinds of control and improvements in the frequencies of the controls can be achieved.

Figure 7:
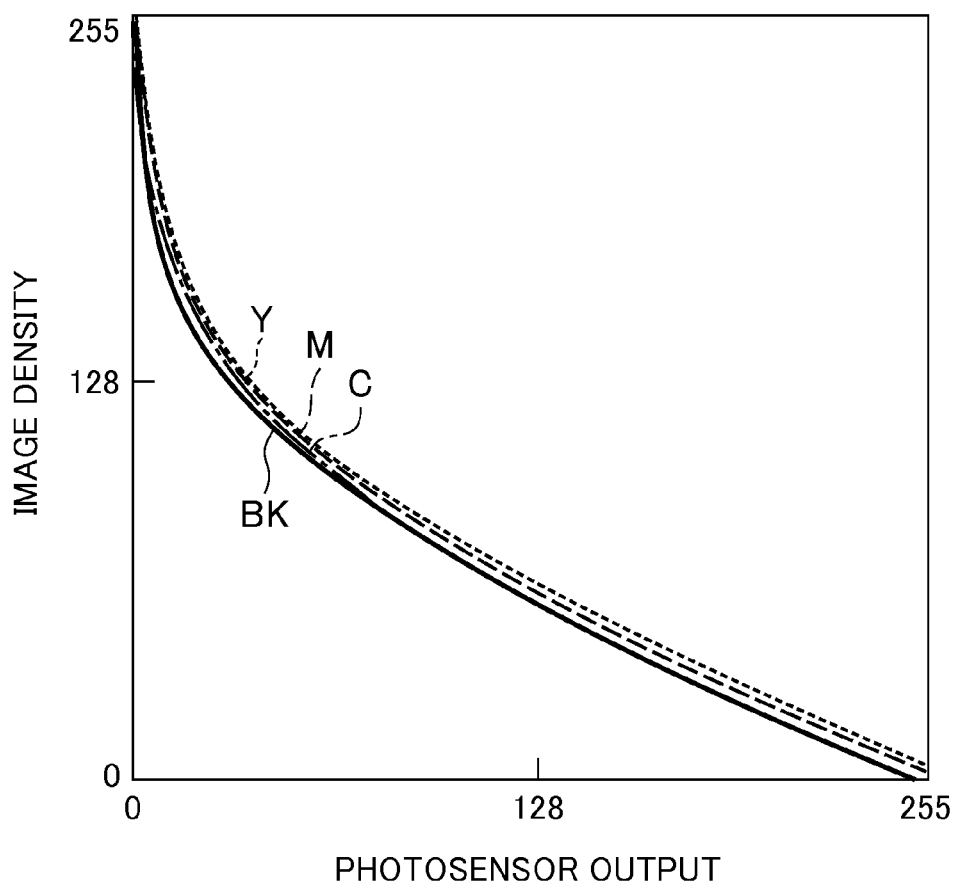
FIG. 7 is a graph showing the relationship between the output from the photosensor and the density of the output image when changing stepwise the density of a patch image formed on the photosensitive drum on the basis of the image signals density-corrected in one of four image processing modes.

FIG. 7 is a graph showing the relationship between the output from the photosensor 40 and the density of the output image when changing stepwise the density of a patch image formed on the photosensitive drum 1 on the basis of the image signals density-corrected in one of the four image forming modes which the gamma correction circuit 209 shown in FIG. 2 has. In the present embodiment, the output from the photosensor 40 in a state where no toner is attached to the photosensitive drum 1 is set to 5 V, i.e., level 255. As shown in FIG. 7, with the increase in percentage of the area covered with each toner, i.e., with the increase in image density, the amount of reflected light is reduced and the output from the photosensor 40 becomes smaller.

A table 42*a* (see FIG. 6) for converting the outputs from the photosensors respectively used for the colors into the density signals according to these characteristics may be provided to enable the density of each color to be read with accuracy. However, it cannot be said that this relationship between the photosensor output and the image density applies to all the image processing modes.

Figure 8:
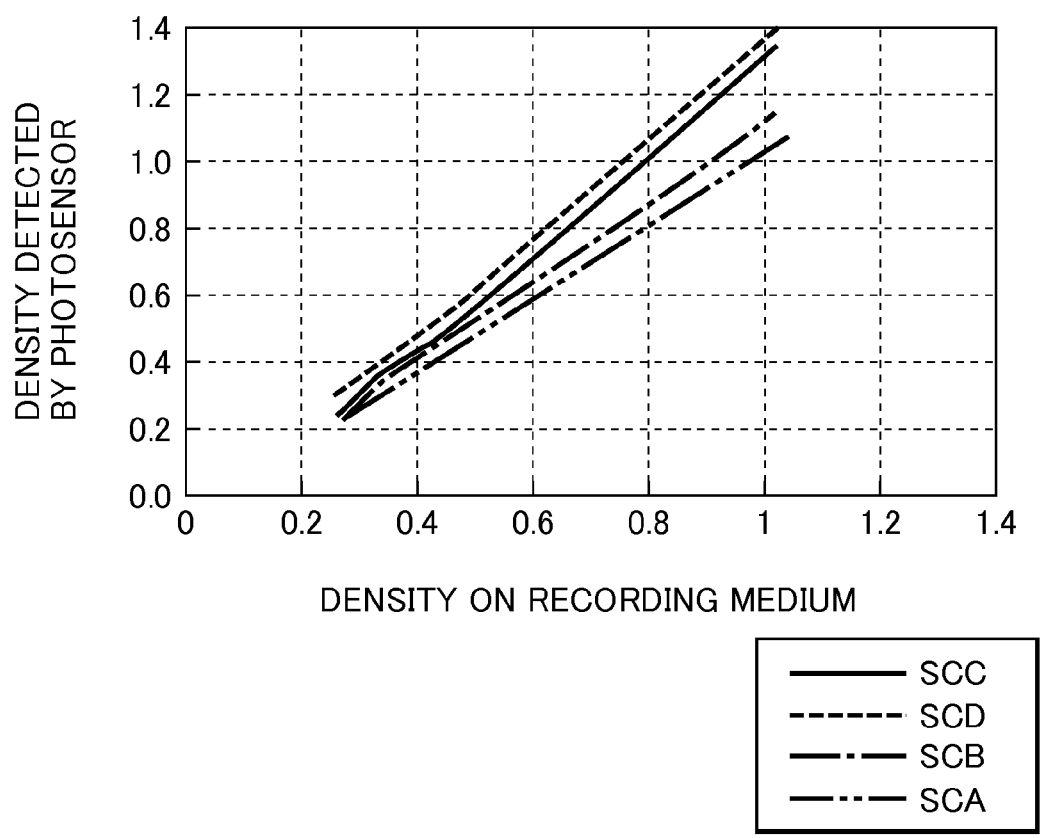
FIG. 8 is a graph showing the relationship between the density of the output image on the recording medium (the density on the recording medium) and the image density on the image bearing member (photosensor detection density) detected with the photosensor and converted when the image signals are density-corrected in each of the four image processing modes.

FIG. 8 is a graph showing the relationship between the density of the output image on the recording medium (the density on the recording medium) and the image density on the image bearing member (photosensor detection density) detected with the photosensor 40 and converted when the image signals are density-corrected in each of the four image processing modes which the gamma correction circuit 209 has. The four image processing modes are the above-described character mode (SCA), printed photograph mode (SCB), photographic paper photograph mode (SCC) and map mode (SCD). Thus, the photosensor 40 has output characteristics changing in correspondence with the image processing modes, and there are correlations between the image processing modes. These correlations are sensitivity characteristics specific to the photosensor 40, varying depending on environments in which the printer unit B is used, and varying with time. However, certain correlations exist between the image forming modes even when environmental changes or changes with time occur therein. In the image forming apparatus 100, a photosensor output-density conversion table is fixed as one table 42*a*, the density-density relationships between the image forming modes are expressed by mathematical functions and are stored in the density conversion circuit 42.

(Outline of Density Gradation Control)

The image forming apparatus 100 is characterized in that a γ-LUT for all the image forming modes is formed by utilizing the above-described characteristics of the photosensor 40 without forming images in all the image forming modes on the recording medium. The CPU 28 of the image forming apparatus 100 performs two kinds of density gradation control described below.

The first density gradation control is performed in a system including both the reader unit A and the printer unit B. In this control, the reader unit A is used as an optical reflection densitometer. The reader unit A is made to read the optical density of a patch image output onto the recording medium through the above-described image forming process and perform matching between the optical density of the image on the recording medium and an image signal sent from the controller section (reader image processing section 108). A γ-LUT is then set such that the desired density gradation characteristic is obtained (control X). Thereafter, a patch image using the set image signal table (γ-LUT) is formed on the image bearing member, and its value is stored as a target value in the second density gradation control thereafter performed (control Y: target setting on the image bearing member). The first density gradation control is performed by a user when the user determines that the desired image gradation has been impaired. This density gradation control using the recording medium is performed by comparing the density of the patch image actually printed on the recording medium with a predetermined density. A correction conditions (a correction parameter, e.g., a γ-LUT for correcting the γ-characteristic) is obtained on the basis of the result of this comparison.

Changes in density in the process including the transfer step and the fixing step are factored in this correction parameter. Therefore the first density gradation control can be said to be high-accuracy density gradation control in comparison with the second density gradation control described below. The first density gradation control, however, requires an operation to be performed by a user, i.e., an operation to move the recording medium output from the image forming apparatus to the reader and make the image forming apparatus execute reading. A certain burden is thereby put on the user.

The second density gradation control is image density gradation control performed in the printer unit B alone. In this control, a patch image is formed on the image bearing member by the same image signal as that in control Y, and the difference (ΔD) between the read density of the patch image and the target value set by control Y is reflected in the γ-LUT. A new γ-LUT is then formed such that the density gradation characteristic on the recording medium becomes the same as that in control X. A setting for the second density gradation control is made in advance to automatically perform the second density gradation control at the time of powering on or periodically after outputting a certain number of recording sheets, i.e., when the possibility of occurrence of a change in characteristics of the printer unit B is high. Optional operations according to a user's preference, such as changing the number of recording sheets for periodic execution and inhibiting execution of the second density gradation control, may also be enabled.

The second density gradation control is lower in accuracy than the first density gradation control. However, setting a predetermined condition, e.g., the number of prints or the lapse of time from the preceding execution of density gradation control enables the image forming apparatus to automatically perform the second density gradation control. In this case, putting a burden on a user by requiring the user to perform a troublesome operation can be avoided.

As described above, target setting in control X is performed immediately after performing the first density gradation control. Therefore, when the first density gradation control is performed with respect to SCA and SCB, target setting respectively corresponding to SCA and SCB is necessarily performed after the first density gradation control. This procedure is utilized the image forming apparatus 100 as described below. Patch images in SCC and SCD are formed on the photosensitive drum at the time of target setting with respect to SCA and SCB, and the correlation between SCA and SCB, and SCC and SCD is computed from the output of the photosensor 40. Also, on the basis of the correlation, correction tables corresponding to SCC and SCD is prepared from the correction table obtained at the time of first density gradation control in correspondence with SCA or SCB. Details of the density gradation control performed by the CPU 28 will now be described with reference to FIGS. 9 to 24.

The correlation, computed as described above, may be stored in the ROM 281 at the time of shipping from a factory. Description will be made of the control flow in the image forming apparatus 100 having the correlation stored in the ROM 281 in the present embodiment. A second embodiment will be described later with respect to the control flow in the image forming apparatus 100 in which the correlation is computed each time the first control is performed.

(First Density Gradation Control)

Figure 9:
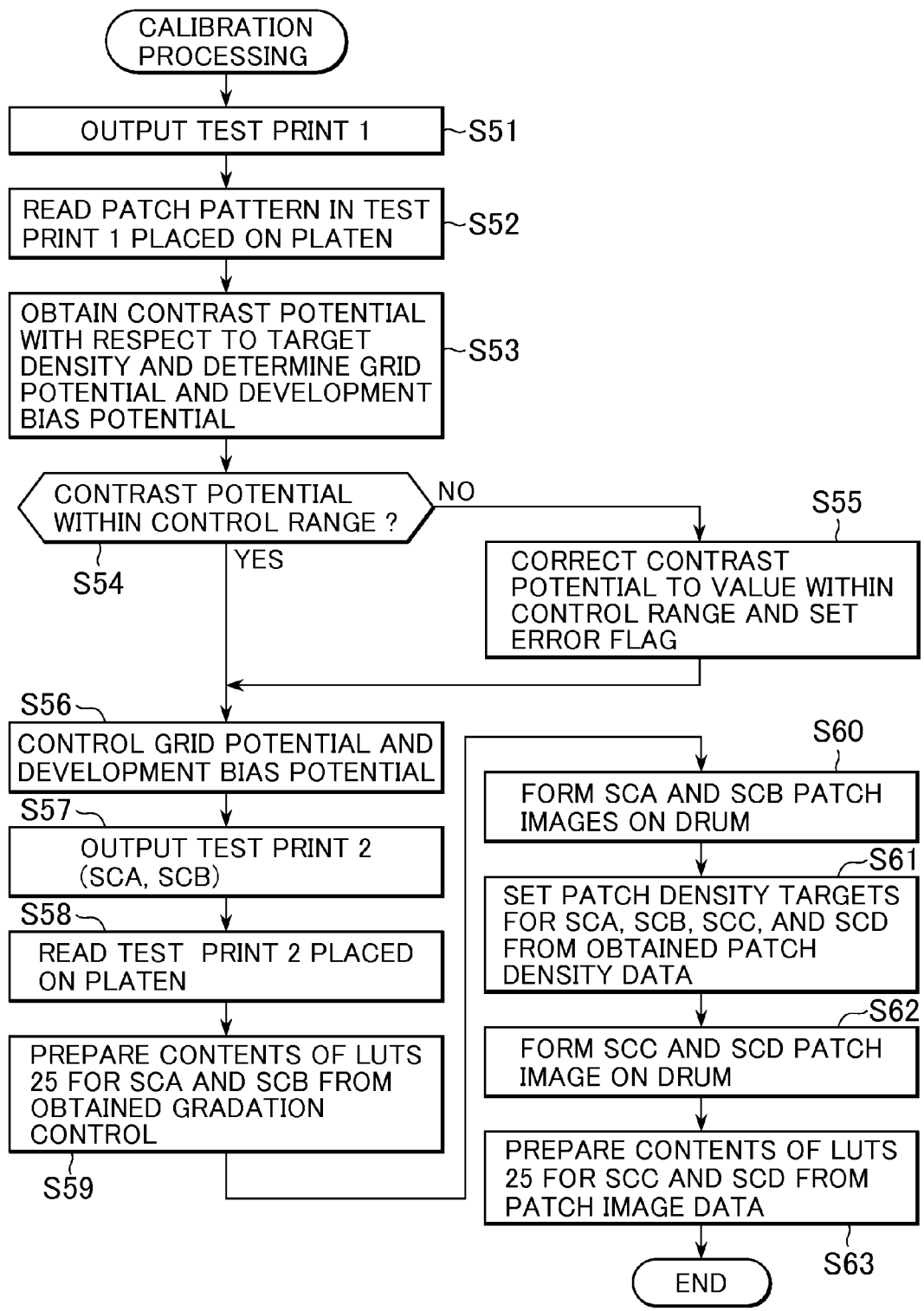
FIG. 9 is a flowchart showing a procedure for calibration process executed by image forming apparatus in the first embodiment.

An operator presses a mode setting button for "Automatic gradation correction" provided in the operating section 217 to start calibration processing. FIG. 9 is a flowchart showing a procedure for calibration process executed by the CPU 28. The display device 218 provided in the operating section 217 is constituted by a liquid crystal operating panel with a touch sensor (touch panel display). FIGS. 10A to 10C, 11A to 11C, 12A to 12E are views showing screens displayed on the display device 218 in FIG. 2.

Figure 10A:
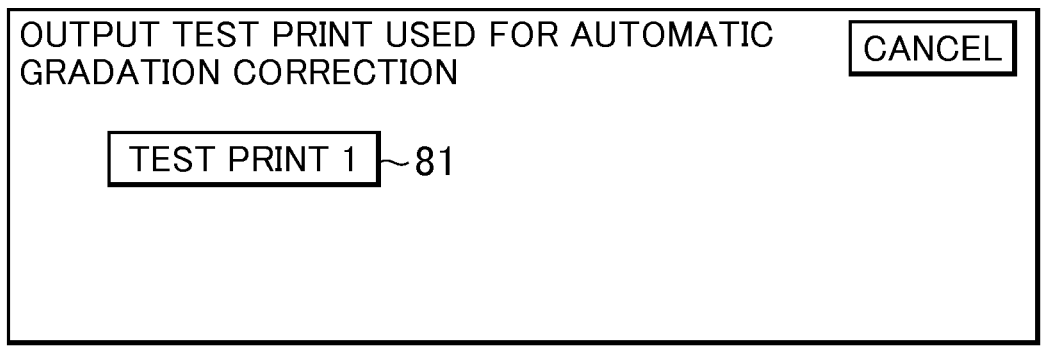
FIGS. 10A to 10C are views showing screens displayed on a display device shown in FIG. 2.

First, a start button 81 for "Test print 1" is displayed on the display device 218 (see FIG. 10A). When the operator pressed the start button 81 for "Test print 1", the CPU 28 controls the start button 81 to display in reverse (see FIG. 10C) and makes the printer unit B print test print 1 (step S51). Test print 1 in the print form shown in FIG. 13 is thereby output.

Figure 10B:
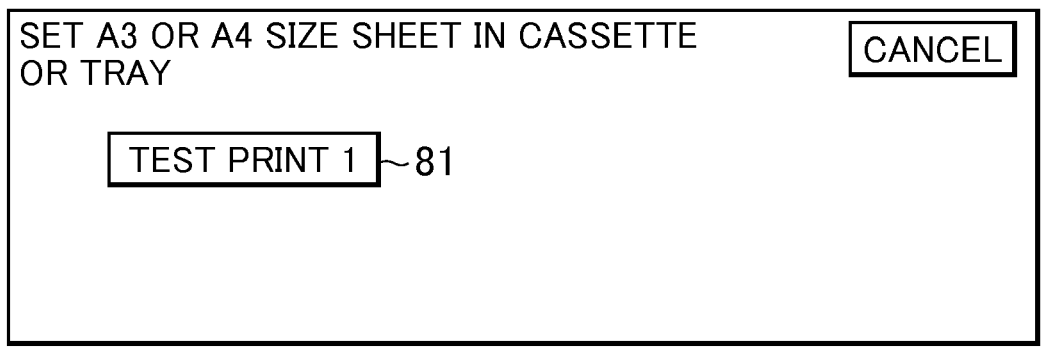
Figure 10C:
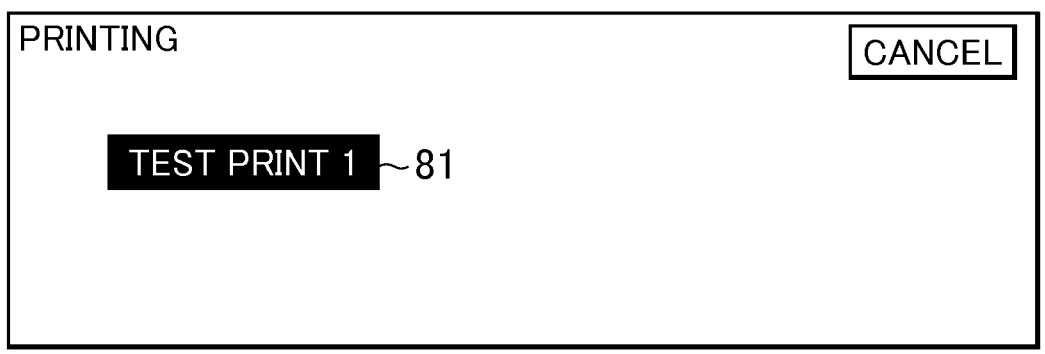

When the start button 81 is pressed, the CPU 28 determines whether or not a recording sheet for forming test print 1 exists. If there is no recording sheet, the CPU 28 makes the display device 218 display a warning such as shown in FIG. 10B. Pattern data for forming test print 1 is stored in a test pattern storage section 31 in the pattern generator 29.

As a contrast potential at the time of forming test print 1, an initial value registered in advance is used. The image forming apparatus 100 in the present embodiment comprises a plurality of recording sheet cassettes and is capable of selecting from a plurality of recording sheet sizes, e.g., B4, A3, A4 and B5. In the present embodiment, the size of the recording sheet used in this calibration processing is set to use a recording sheet of large sheet size, i.e., A3, the dimensions of which is 11"×17" to avoid misplacement between vertical and horizontal positions in a reading operation performed afterward.

Figure 13:
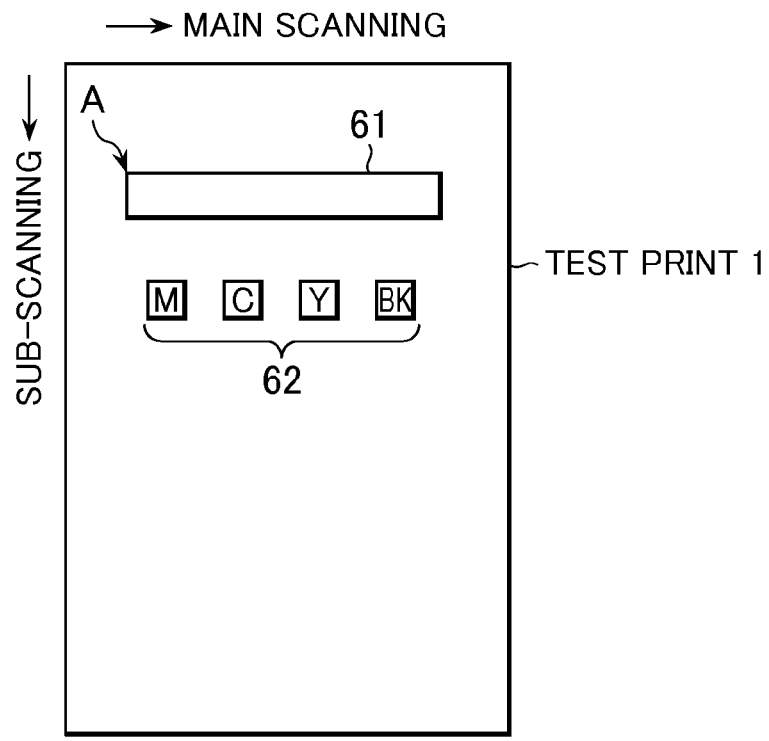
FIG. 13 is a view showing the print form of test print 1 output by the processing shown in FIG. 9.

Test pattern 1 shown in FIG. 13 includes a stripe pattern 61 at a half-tone gradation density of the four colors: Y, M, C, and Bk, and patch patterns 62 respectively printed in the four colors. The pattern 61 is visually examined to check whether or not any streak of abnormal image, density nonuniformity and/or color nonuniformity exists. The sizes of the patch patterns 62 and gradation patterns 71 and 72 contained in a test pattern 2 described below (see FIG. 19) are set to so as to be within the reading range of the CCD sensor 105 in the thrust direction.

The patch patterns 62 are patch patterns corresponding to the maximum-density patches of the colors Y, M, C, and Bk, i.e., the density signal value 255. After the completion of output of test pattern 1, the CPU 28 displays "Read" button 91 and an operation guidance message for the operator (see FIG. 11A) on the display portion 218 to make the reader unit A read test print 1. The operator places the output test print 1 on the platen glass 102 according to this message, for example, as shown in FIG. 14, and presses the "read" button 91.

Figure 14:
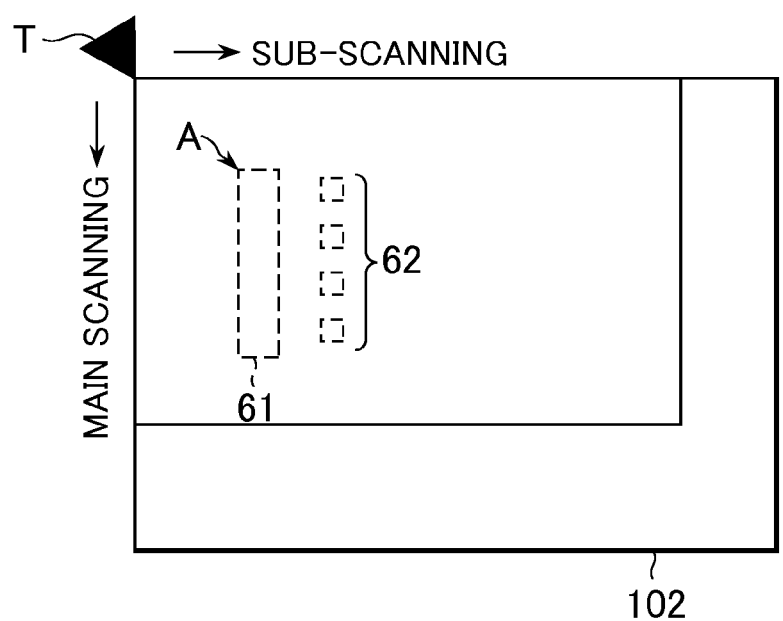
FIG. 14 is a view showing a state in which a platen on which test print 1 shown in FIG. 13 is placed is viewed from above.

FIG. 14 is a view showing a state in which the platen 102 on which test print 1 shown in FIG. 13 is placed is viewed from above. In FIG. 14, a wedge-shaped mark T at an upper left position is a mark for positioning the original. The operation guidance message is displayed on the display device 218 (see FIG. 11A) to make the operator place test print 1 so that the stripe pattern 61 is placed on the mark T side and the front and back of test print 1 are correctly set. That is, the operation guidance is provided for the purpose of preventing erroneous control due to misplacement of test print 1.

Figure 11A:
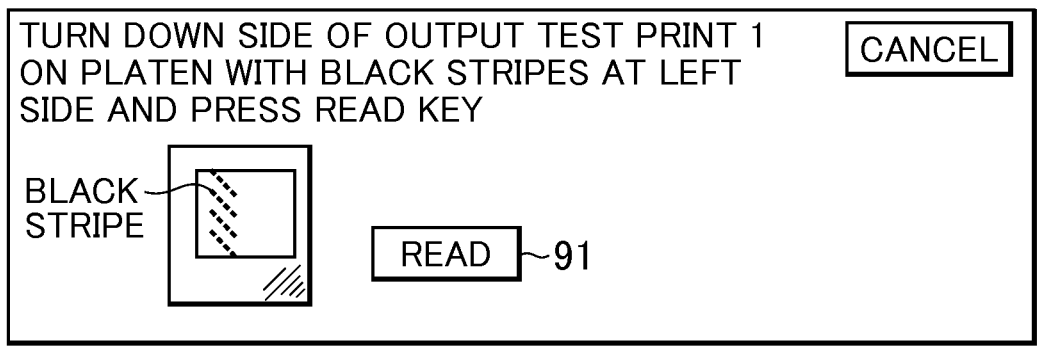
FIGS. 11A to 11C are views showing screens displayed on the display device.
Figure 11B:
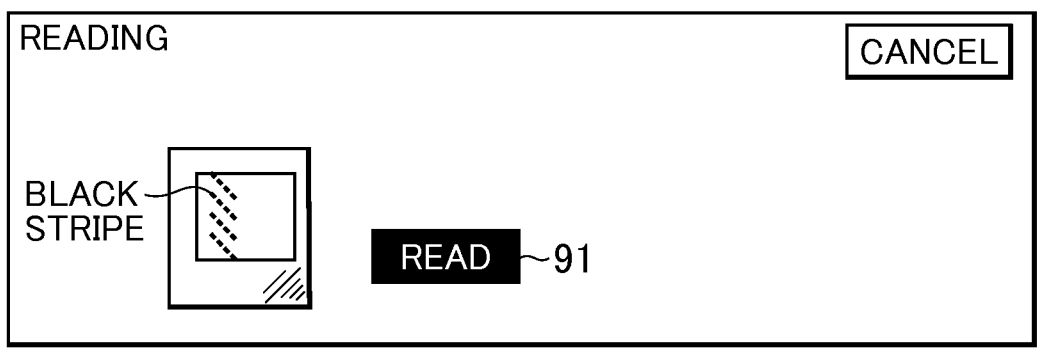
Figure 11C:
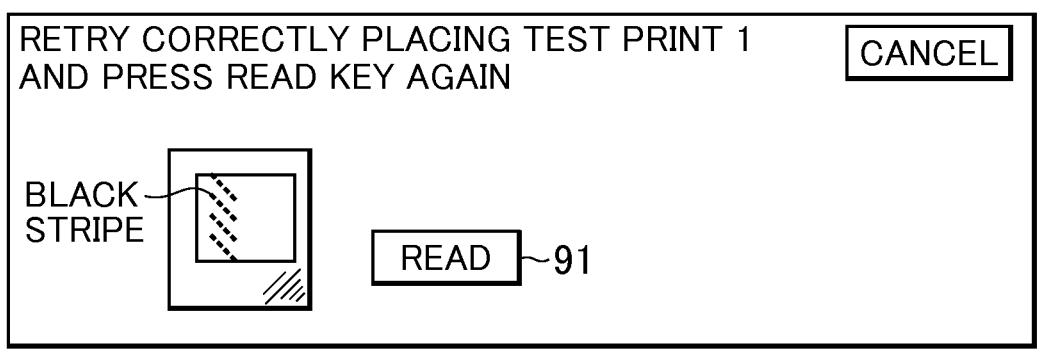

As the test print 1 is gradually scanned from the mark T in reading the patch pattern 62 of test print 1, the first density gap point is obtained at the corner of the stripe pattern 61 (at point A in FIG. 13 or 14). The CPU 28 computes the relative position of respective color patches in the patch pattern 62 based on the coordinates of the point A as the density gap point and reads the density of the patch pattern 62 (step S52). A screen such as shown in FIG. 11B is displayed while test print 1 is being read. In a case where the orientation or position of test print 1 is incorrect or test print 1 cannot be read, a message such as shown in FIG. 11C is displayed to make the operator correct the placement of test print 1 and press the "Read" key 91. The CPU 28 then performs processing for making the reader unit A again read test print 1.

Equations (1) are used to convert the values R, G, and B obtained from the patch patterns 62 into optical densities. To set the same values as those on densitometers on the market, correction coefficients km, kc, ky, and kk are adjusted. A LUT specially obtained may alternatively be used to convert the RGB luminance information into MCYBk density information without performing computation.

$$M=-km\times\log_{10}(G/255)$$

$$C=-kc\times\log_{10}(R/255)$$

$$Y=-ky\times\log_{10}(B/255)$$

$$Bk=-kk\times\log_{10}(G/255) \quad (1)$$

Figure 15:
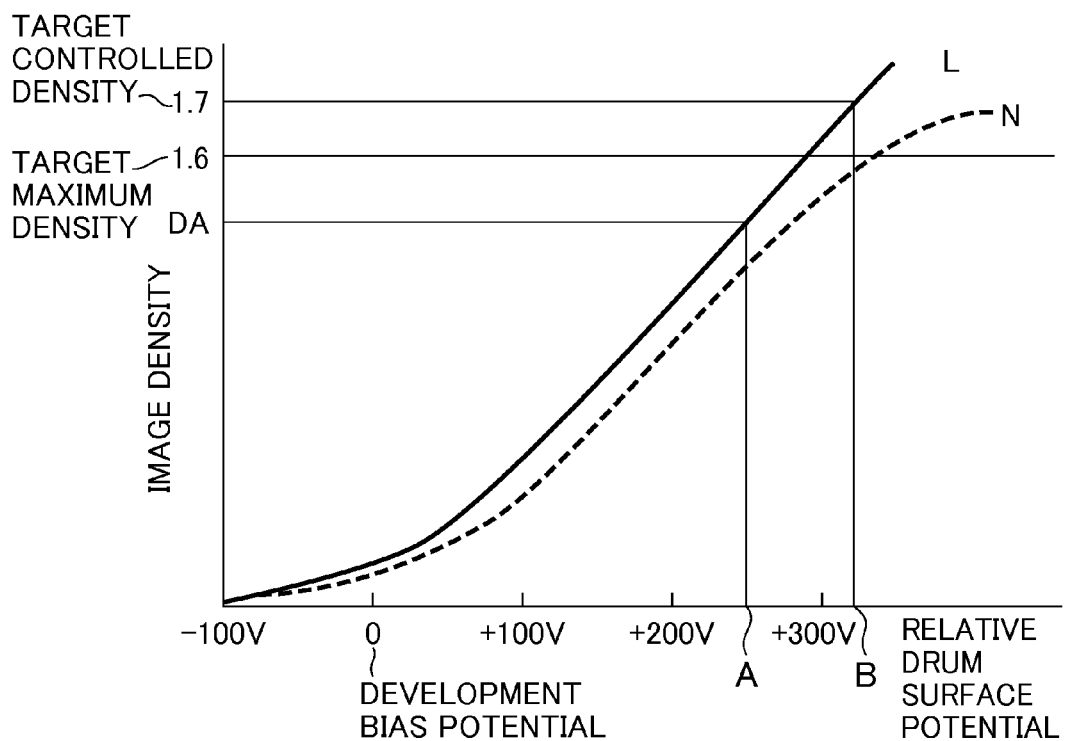
FIG. 15 is a graph showing the relationship between the relative drum surface potential on the photosensitive drum and the image density obtained by computation using equations (1).

A method of correcting the maximum density from the obtained density information will be described. FIG. 15 is a graph showing the relationship between the relative drum surface potential on the photosensitive drum 1 and the image density obtained by computation using equations (1). In FIG. 15, value A represents the contrast potential at the time of printing of test print 1, i.e., the difference between the development bias potential and the surface potential on the photosensitive drum 1 exposed to laser light at the maximum signal value (which is 255 if the signal is 8-bit) after primary charge of the photosensitive drum 1. Value DA represents the image density obtained from the patch pattern 62 printed at a density of 255.

In a maximum density region, the image density with respect to the relative drum surface potential changes generally linearly with respect to the relative drum surface potential, as indicated by solid line L in FIG. 15. In some cases in a two-component development system, however, the image density with respect to the relative drum surface potential in the maximum density region becomes nonlinear if the density of toner constituting the developer in the development device is reduced, as indicated by broken line N in FIG. 15. Therefore, in the example shown in FIG. 15, when the target value of the final maximum value is set to 1.6, the control amount is determined by setting the control target value (target controlled density) of the maximum density to 1.7 while expecting a margin of 0.1. Contrast potential B corresponding to the target maximum density (target controlled density) is obtained by equation (2).

$$B=(A+Ka)\times 1.7/DA \quad (2)$$

In equation (2), Ka is a correction coefficient. Preferably, the value of Ka is optimized with respect to the type of the development method.

Figure 16:
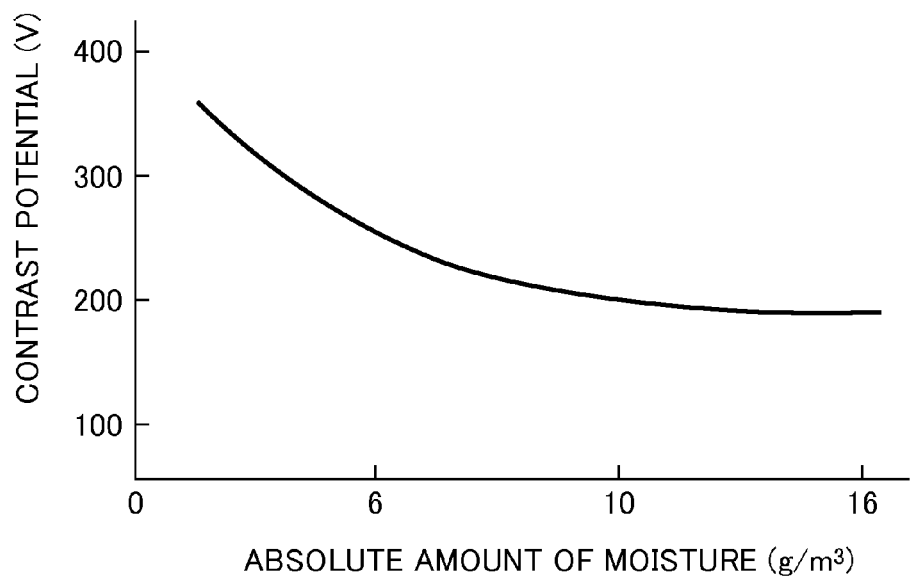
FIG. 16 is a graph showing the relationship between the contrast potential and the absolute amount of moisture.

In the electrophotographic method, the densities of the original image and the output image do not equal each other unless the contrast potential is set according to the environment. Therefore, the value of contrast potential A is set as shown in FIG. 16, for example, on the basis of the output from an environment sensor 33 for monitoring the amount of moisture in the image forming apparatus 100 (i.e., the absolute amount of moisture) as described above. FIG. 16 is a graph showing the relationship between the contrast potential and the absolute amount of moisture.

For correction of contrast potential A to contrast potential B, a correction coefficient Vcont.rate1 shown in equation (3) is stored in the RAM (NVRAM) 282 or the like used for data backup.

$$V\text{cont.rate1}=B/A \quad (3)$$

Figure 17:
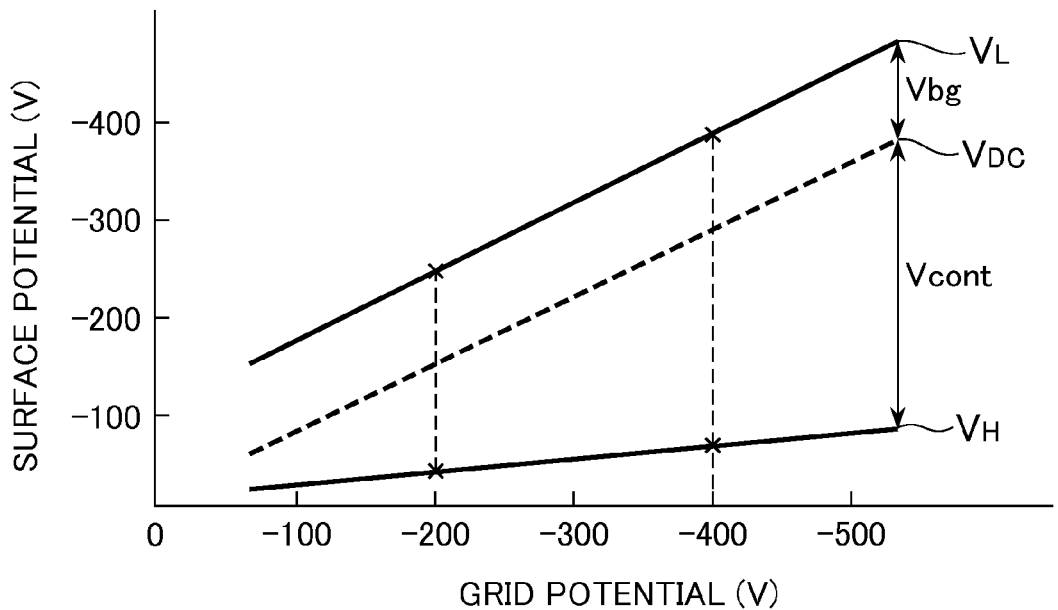
FIG. 17 is a graph showing the relationship between the grid potential and the surface potential on the photosensitive drum.

A method of obtaining the grid potential and the development bias potential from the contrast potential will be described briefly. FIG. 17 is a graph showing the relationship between the grid potential and the surface potential on the photosensitive drum 1. Surface potential $V_L$ on the photosensitive drum 1 exposed laser light modulated at the minimum signal value and surface potential $V_H$ on the photosensitive drum 1 exposed laser light modulated at the maximum signal value, when the grid potential is −200 V, are first measured with a surface potential sensor (not shown). Similarly, surface potentials $V_L$ and $V_H$ when the grid potential is −400 V are measured. The relationship between the grid potential and the surface potential is obtained by interpolating and extrapolating data at the grid potential −200 V and data at the grid potential −400 V. Control for obtaining this potential data is referred to as potential measurement control.

Next, development bias $V_{DC}$ is set by providing a different Vbg (e.g., 100 V) from surface potential $V_L$ set to a value such that no fogging toner is caused in the image. Contrast potential Vcont obtained by computing is a differential potential between development bias $V_{DC}$ and potential $V_H$ on the photosensitive drum 1 exposed light produced by a pulse signal corresponding to the maximum density. If the contrast potential Vcont is increased, the maximum density becomes higher, as described above.

The grid potential and the development bias for setting the value of the contrast potential Vcont obtained by computation as the desired value for the constant potential B can be obtained from the relationship shown in FIG. 17. Accordingly, the CPU 28 sets the value of the contrast potential Vcont so that the maximum density is higher by 0.1 than the final target value, and determines the grid potential and the development bias so that the set value of the contrast potential Vcont is obtained (step S53).

The CPU 28 determines whether or not the determined that the value of the contrast potential Vcont is within the control range (step S54). If the value of the contrast potential Vcont is out of the control range, the CPU 28 determines that there is an abnormality in one of the development devices 5K, 5Y, 5M, and 5C having the correspondence color, or the like and sets an error flag to urge the service person to check the correspondence one. The status of this error flag can be seen in a predetermined service mode by the service person. In the event of abnormality, the image forming apparatus 100 corrects the value of the contrast potential Vcont in such a manner that the value of the contrast potential Vcont barely falls within the control range, and continues control (step S55).

If the value of the contrast potential Vcont is within the control range in step S54, or if the value the contrast potential Vcont is corrected in step S55, the CPU 28 controls the grid potential and the development bias potential so that the set the value of contrast potential Vcont is obtained (step S56).

Figure 18:
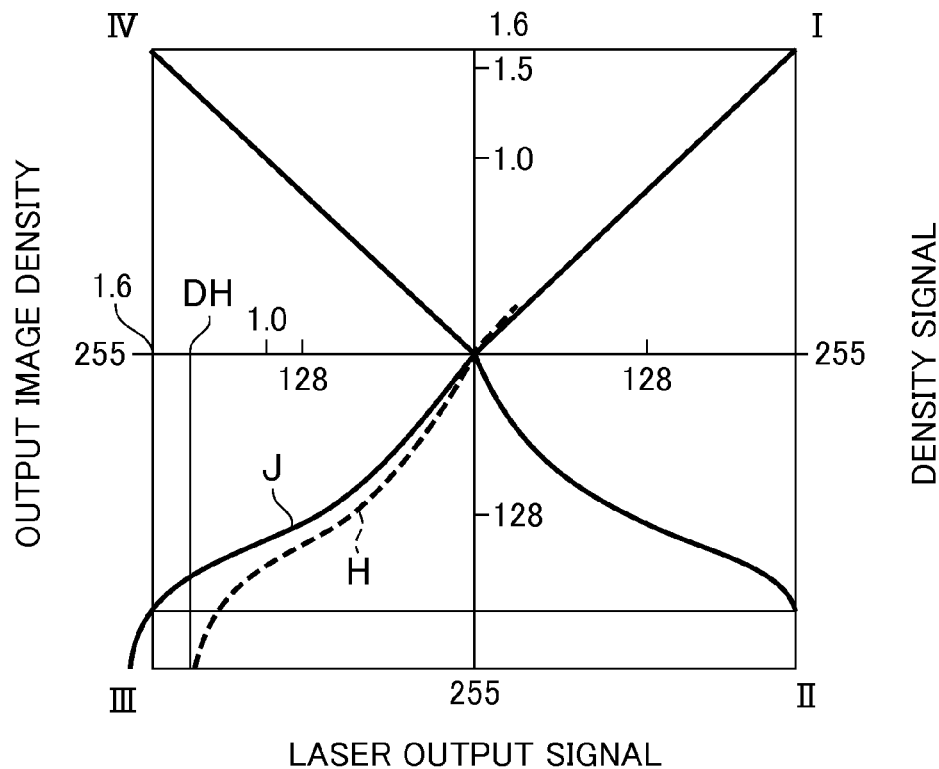
FIG. 18 is a graph in four-quadrant form showing density conversion characteristics before and after contrast potential control.

FIG. 18 is a graph in four-quadrant form showing density conversion characteristics before and after contrast potential control. In the present embodiment, control of setting the maximum controlled density "1.7" higher than the final target value "1.6" is performed. Thus a printer characteristic such as indicated by solid line J in the quadrant III can be obtained. If control such as described above is not performed, there is a possibility of generation of such a printer characteristic that the maximum controlled density does not reach the target density "1.6", as indicated by broken line H. In the case where the printer characteristic is as indicated by broken line H, the maximum density cannot be increased by means of the LUT 25. The density region between the density DH and the target density 1.6 cannot be reproduced by any setting of the LUT 25. In the case of the printer characteristic slightly exceeding the maximum density as indicated by solid line J, the desired density reproduction range can be ensured by the correction using the LUT 25, as indicated by the total gradation characteristic shown in the quadrant IV.

Figure 12A:
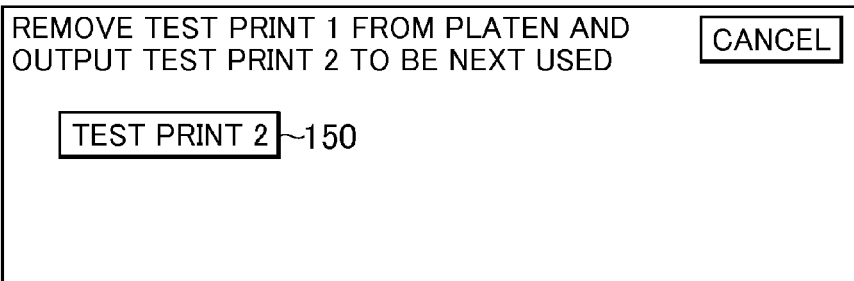
FIGS. 12A to 12E are views showing screens displayed on the display device.
Figure 12B:
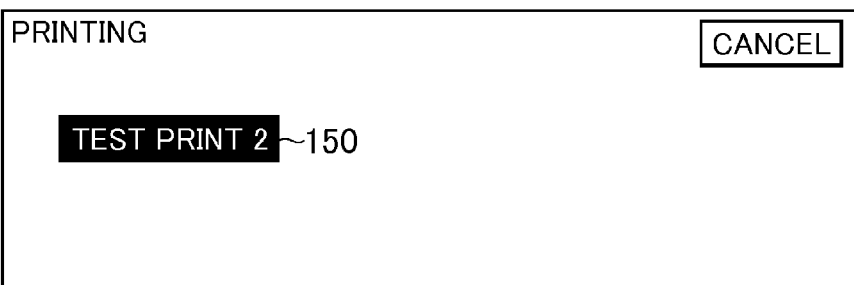
Figure 12C:
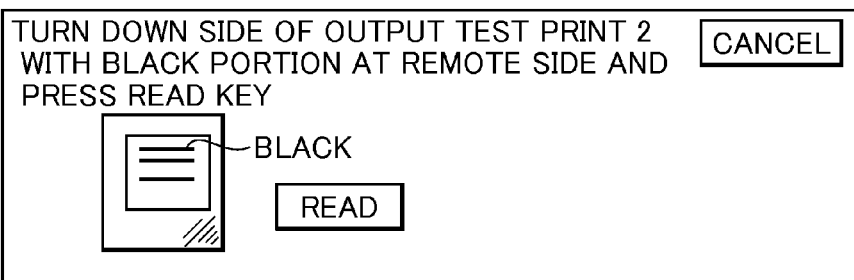
Figure 19:
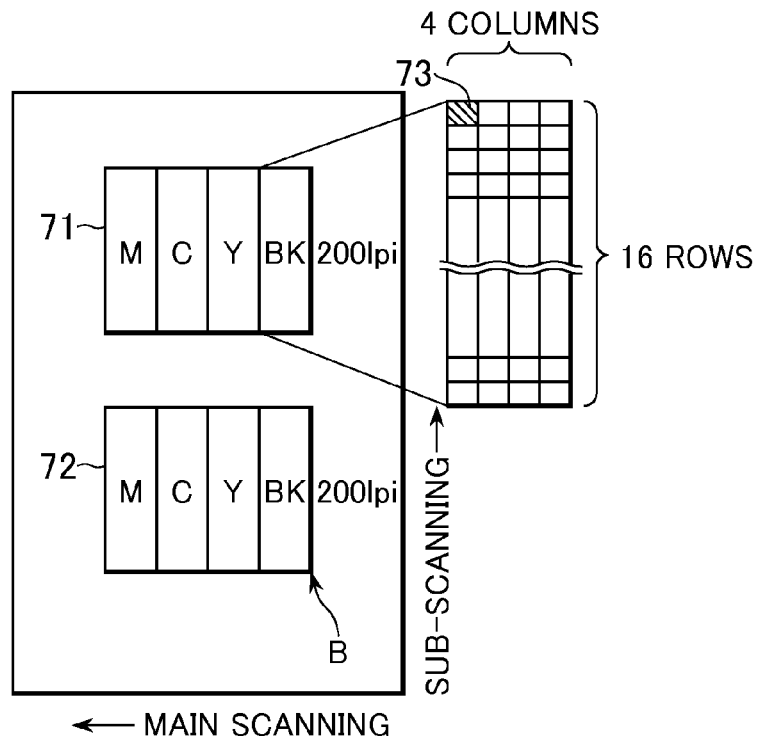
FIG. 19 is a view showing the print form of test print 2 output by the processing shown in FIG. 9.

After the completion of setting of the grid potential and the development bias potential in step S56, the CPU 28 makes the display device 218 display a print start button 150 and an operating guidance message with respect to test print 2, as shown in FIG. 12A. When the operator presses print start button ("test print 2" button) 150 for start printing test print 2, the CPU 28 makes the printer unit B print test print 2 (step S57). Test print 2 in the print form shown in FIG. 19 is thereby output. The state of the display portion 218 during printing is as shown in FIG. 12B.

As shown in FIG. 19, test print 2 is formed of gradation patch groups in which 4×16 patches 73 (corresponding to 64 gradation steps) are arranged with respect to each of the colors Y, M, C, and Bk. The 64 gradation steps are selected from full 256 gradation steps by selecting gradations in a low density region with priority and by thinning out gradations in a high density region. This is intended to suitably adjust the gradation characteristic in a highlighted portion in particular.

In FIG. 19, patch pattern 71 is a group of patches for SCA, and patch pattern 72 is a group of patches for SCB. Test print 2 is printed on the basis of the image signals generated from the pattern generator 29 without operating the LUT 25. These image processing modes are two of the four image processing modes freely set by the user.

Figure 12D:
Figure 20:
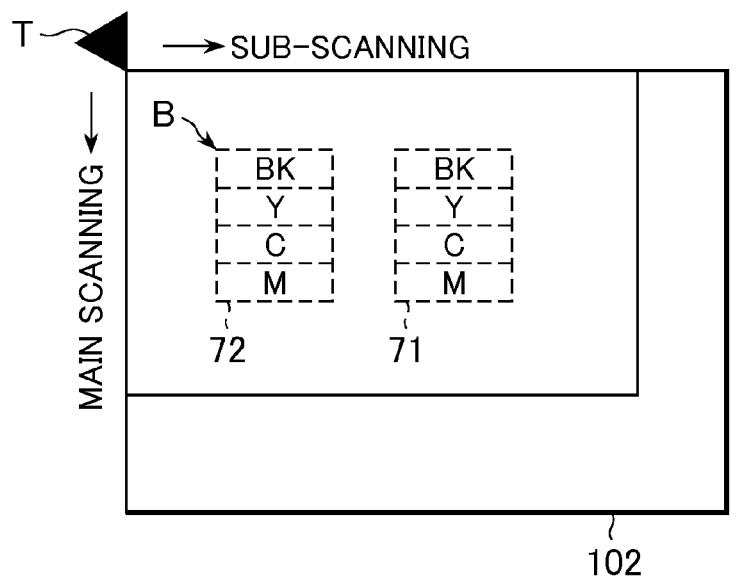
FIG. 20 is a view showing a state in which the platen on which test print 2 is placed is viewed from above.

As scanning progresses from the mark T in reading the patch patterns 71 and 72, the first density gap point is obtained at the corner of the patch pattern 72 (at point B in FIGS. 19 and 20). FIG. 20 is a view showing a state in which the platen 102 on which test print 2 is placed is viewed from above. In the image forming apparatus 100, the CPU 214 computes the relative position of respective color patches in the patch patterns 71 and 72 based on the coordinates of the point B as the density gap point and reads the densities of patch patterns 71 and 72 (step S58). A screen such as shown in FIG. 12D is displayed while test print 2 is being read.

Figure 21:
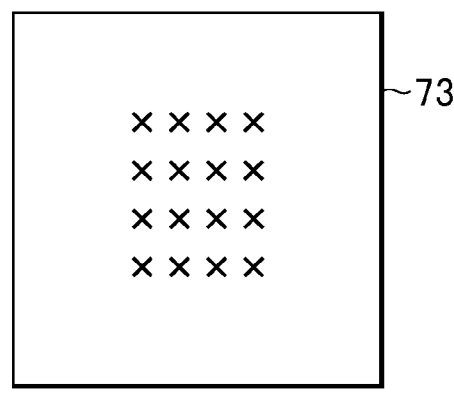
FIG. 21 is a view showing internal portions of a patch shown in FIG. 19.

FIG. 21 is a view showing internal portions of patch 73 shown in FIG. 19. The read value of patch 73 is an average of values obtained by reading sixteen points set in the patch as shown in FIG. 21. Preferably, the number of reading points from which an average value is computed is optimized according to the reader unit A and the printer unit B.

Figure 22:
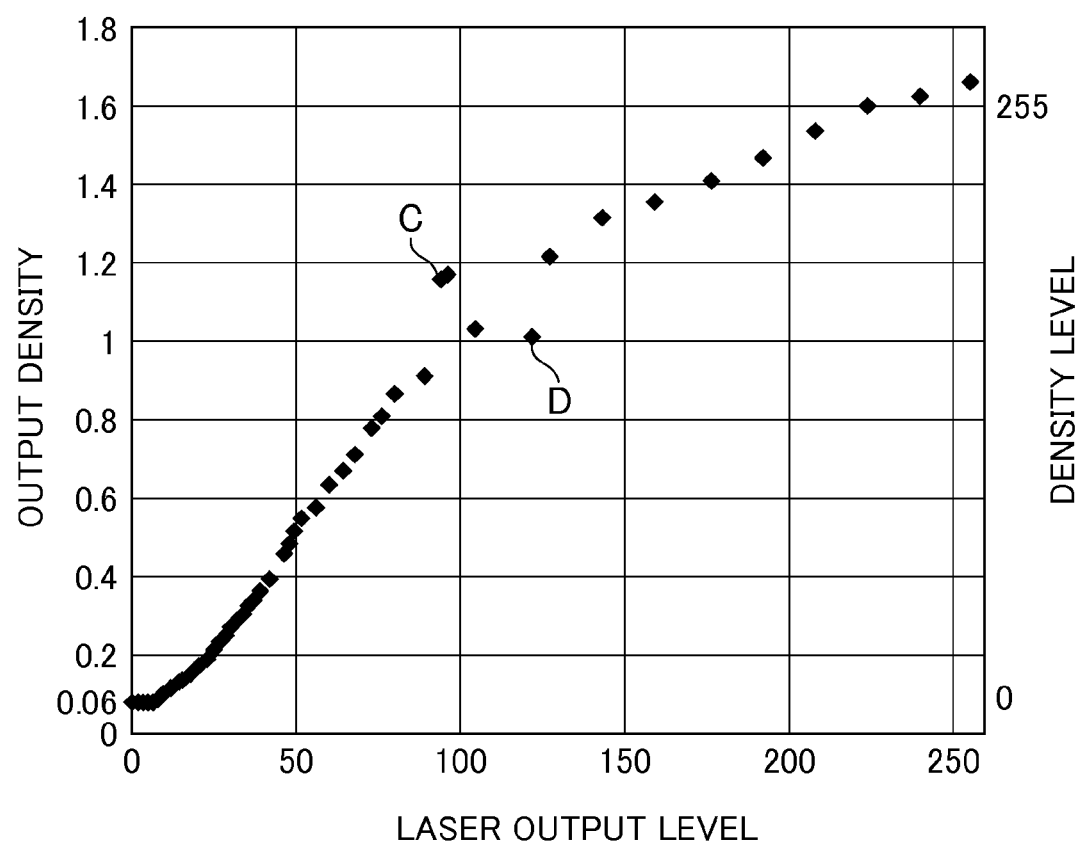
FIG. 22 is a graph showing the relationship between the output density and the laser output level (the value of the image signal).

FIG. 22 is a graph showing the relationship between the output density and the laser output level (the value of the image signal). The output density is obtained by converting the signals R, G, and B obtained from the patches into density values by the above-described method of conversion into optical densities. The ordinate on the right-hand side is normalized by indicating the base density of the recording sheet (e.g., 0.08) as level 0 and indicating the maximum density target value 1.60 as level 255.

In a case where the read density of the patches includes singularly high as indicated at point C in FIG. 22 or singularly low as indicated at point D in FIG. 22, contamination of the platen glass 102 or a defect in the test pattern is thought to be a cause of the singular value. In such case, the gradients between the adjacent output densities are corrected by operating a limiter thereon so that the continuity between the output density and the laser output level is maintained. For example, in a case where the gradient between output densities exceeds a value 3, the gradient is fixed at the value 3 and a data item determining a minus gradient is set to the same value as that of the patch one-step lower in density.

Figure 23:
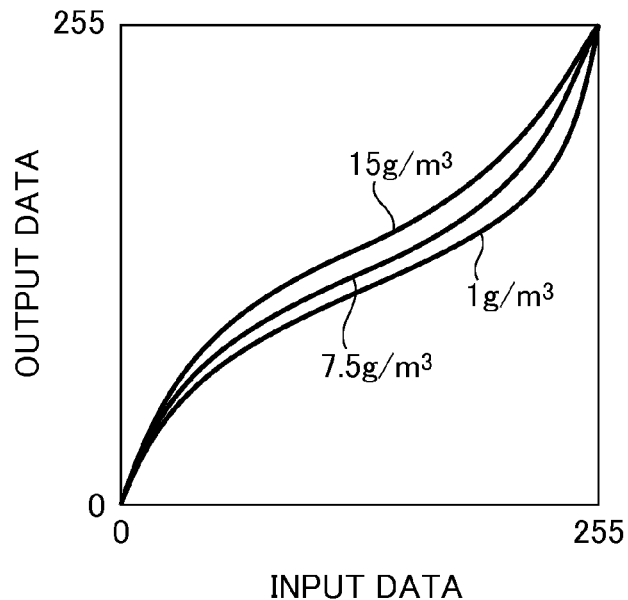
FIG. 23 is a graph showing a plurality of LUTs according to amounts of moisture.

To correct such a printer characteristic and make the total gradation characteristic of the image forming apparatus 100 linear, a conversion characteristic reverse to the characteristic shown in FIG. 22 may be set in the LUT 25. That is, setting the density level (the ordinate of FIG. 22) as the input level (the density signal in FIG. 4) and setting the laser output level (the abscissa of FIG. 22) as the output level (the laser output signal in FIG. 4) may be performed. In setting this characteristic, values for levels not corresponding to the patch are obtained by interpolation computation. Also, a condition is set such that zero output level is exhibited with respect to zero input level. FIG. 23 is a graph showing a plurality of LUTs according to amounts of moisture. Output data represented by the ordinate corresponds to the laser output level. Input data represented by the abscissa corresponds to the density level. In this graph, LUTs associated with moisture amounts of 15 $g/m^3$, 7.5 $g/m^3$, and 1 $g/m^3$ are shown.

The CPU 28 thus obtains LUTs 25 for SCA and SCB (step S59).

In the present embodiment, the optical density on the recording medium is read with the reader unit A mounted on the printer unit B, as described above. Therefore, there is no need to separately provide an image reader for reading test pattern 1, and the construction of the image forming apparatus 100 can be simplified. However, the present invention is not limited to the described embodiment. Test pattern 1 may be read with a density reading sensor, e.g., a color sensor provided on a transport path downstream of the fixing device in the printer unit B.

(Second Density Gradation Control)

After preparation of the LUTs 25 for SCA and SCB, the CPU 28 forms SCA, SCB, SCC and SCD patch images on the photosensitive drum 1 (image bearing member) (step S60).

Figure 24:
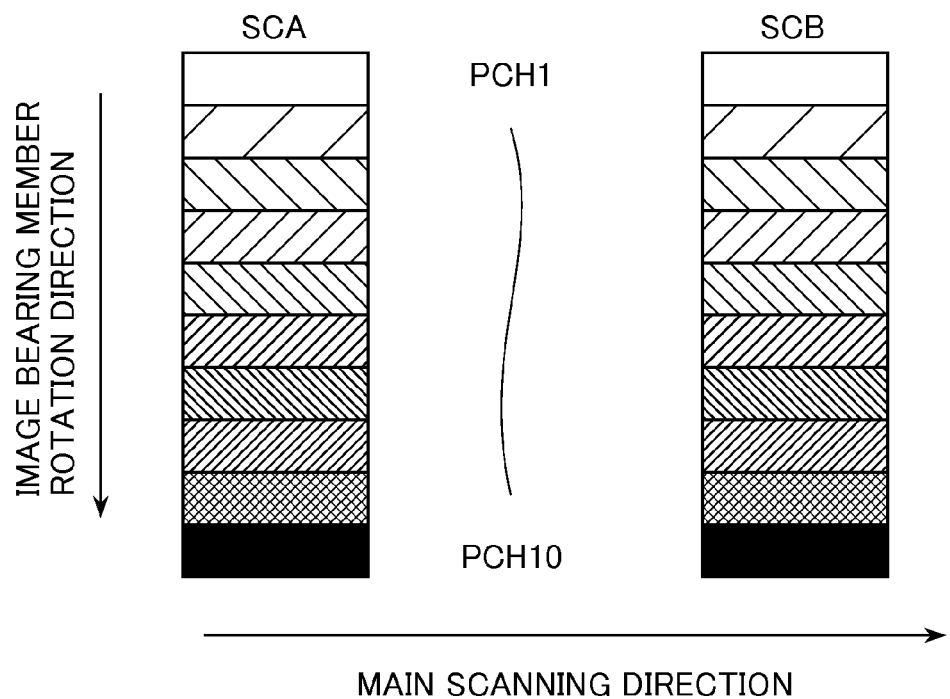
FIG. 24 is a view showing patch images formed on the photosensitive drum in two image processing modes SCA and SCB.

FIG. 24 is a view showing patch images formed on the photosensitive drum 1 in two image processing modes SCA and SCB. As SCA and SCB patch images, patch images through 10 levels from a highlight density to a dark density are newly formed on the photosensitive drum 1 on the basis of the LUTs 25.

For the generation of the image signals for these patch images, the LUT 25 determined by the first density gradation control are used. The densities of the patch images on the photosensitive drum 1 are detected with the photosensor 40. On the patches corresponding to each level, 8-point sampling is performed. Upper two points and lower two points are cut off from the output, and the remaining four points are thereafter averaged, thereby stabilizing the data accuracy.

The patch images are measured with the photosensor 40, and a bias voltage reverse to that used at the time of ordinary image forming is thereafter applied in the primary transfer section to enable the patch image as the toner images to be collected by the cleaning device 4 on the photosensitive drum 1 instead of being transferred from the photosensitive drum 1 onto the transfer belt 3.

Data on the densities of the SCB and SCB patch images on the image bearing member detected with the photosensor 40 is data obtained by performing the second density gradation control immediately after forming the patch images on the recording medium under the first density gradation control. In the image forming apparatus 100 according to the present embodiment, this density data is set as a target value at the time of performing the second density gradation control.

Then, with respect to the density value of the patch image set as a reference target for SCA, the mathematical function obtained from the output characteristic difference between the image processing modes in the photosensor 40 shown in FIG. 8 is used. In the image forming apparatus 100, the CPU 214 thereby determines target values for the SCC and SCD images on the photosensitive drum 1 (step S61) By the above-described processing, setting of density control target values on the photosensitive drum 1 (image bearing member) in the four image processing modes is completed.

By the operation up to this point, target values for target densities at the time of performing the second density gradation control for all the four image forming modes have been set.

The CPU 28 forms on the photosensitive drum 1 groups of patch images through 10 levels in the SCC and SCD patch images (step S62), as it does with respect to SCA and SCB. At this time, since no γ-LUTs exist with respect to SCC and SCD, the γ-LUT for SCA is utilized to generate the image signals used for forming the SCC and SCD patch images. The CPU 28 makes the photosensor 40 detect these patch images and performs density conversion on the basis of the detection results in the same way as in the above.

Differences ΔD between the density values of the groups of patch images through 10 levels obtained in step S62 and the density target values for the patch images through 10 levels in SCC and SCD obtained by converting the density results of the SCA path images described above respectively correspond to the differences between the LUTs 25 to be set with respect to SCC and SCD and the LUT 25 for SCA.

Figure 12E:
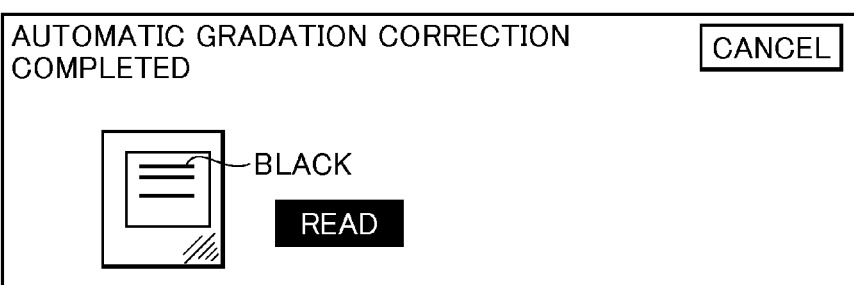

The CPU 28 performs computation for correction of these differences on the LUT 25 for SCA to obtain LUTs 25 for SCC and SCD (step S63). As a result, LUTs 25 for all the four image forming modes are generated and the density gradation control ends. That is, operations to form patch images on the recording medium in all the image forming modes and user operations to make the reader read the optical density of the patch images in the density gradation control can be reduced as largely as possible in the above-described way. The display device 218 displays a screen such as shown in FIG. 12E. Generation of all the LUTs 25 is thus completed.

While the number of patches in each patch image is set to 10 in the present embodiment, a larger number of patches may be set in order to further improve the accuracy. Also, in the present embodiment, an arrangement for performing density gradation control using images on the recording medium with respect to two of four image forming modes as a method of setting LUTs 25 to be prepared has been illustrated. However, the number of image forming modes in which density gradation control using the recording medium is performed may be smaller than the number of image forming modes which the image forming apparatus has.

The second density gradation control performed in order of (i) forming patch images in SCA and SCB, (ii) setting density target values in SCA, SCB, SCC, and SCD, and (iii) forming patch images in SCC and SCD has been described. However, the second density gradation control may alternatively be performed by performing (i) and (iii) by the same timing and thereafter performing (ii).

In the image forming apparatus 100 according to the present embodiment, the correlations of the output characteristics of the photosensor 40 on the photosensitive drum 1 provided as an image bearing member between image forming modes, are utilized to enable density gradation control with high accuracy while minimizing patch image outputs to the recording medium, for which a high burden is put on the user.

The present invention is not limited to the arrangement in the above-described embodiment. Any arrangement may be used if the functions described in the appended claims or the functions which the arrangement in the embodiment has can be achieved.

For example, in the image forming apparatus 100, automatic density gradation control (second density gradation control) to be performed in the printer unit B alone is executed at the time of powering on or after outputting a certain number of sheets (reference setting: 500 sheets in total (in A4 horizontal form), as described above. In this case, patch images are formed on the photosensitive drum 1 in all the four image forming modes. To generate image signals in this case, γ-LUTs determined by the first density gradation control are used with respect to SCA and SCB, and γ-LUTs determined by the second density gradation control are used with respect to SCC and SCD. Patch images through 10 levels formed on the photo sensitive drum 1 based on the generated image signals are respectively detected with the photosensor 40 and converted into density values. Density differences (ΔD) between these density values and target density values determined in the second density gradation control are computed. Correction (updating) is performed so that the respective density differences (γD) are reflected in LUTs 25 for respective image forming modes, thereby maintaining density gradations at the time of "automatic gradation correction".

An arrangement in which a color sensor is provided downstream of the fixing device 8 and patch images formed on the recording medium are read with the color sensor may alternatively be adopted. This arrangement enables the image forming apparatus to automatically perform the first density gradation control. The burden on the user can be reduced in this way.

While the present embodiment has been described with respect to a case where a LUT is obtained as a correction parameter. However, preparation of a LUT is not necessarily required. A correction function or the like may be substituted for the correction parameter.

In the present embodiment, the correlation between SCA and SCB, and SCC and SCD, which is computed based on the density of patch images formed on the photosensitive drum 1, is previously stored in the ROM 281. However, the present invention is not limited to the described embodiment. The above correlation previously stored in the ROM 281 can be computed based on toner images formed on the recording medium.

Second Embodiment

Figure 25:
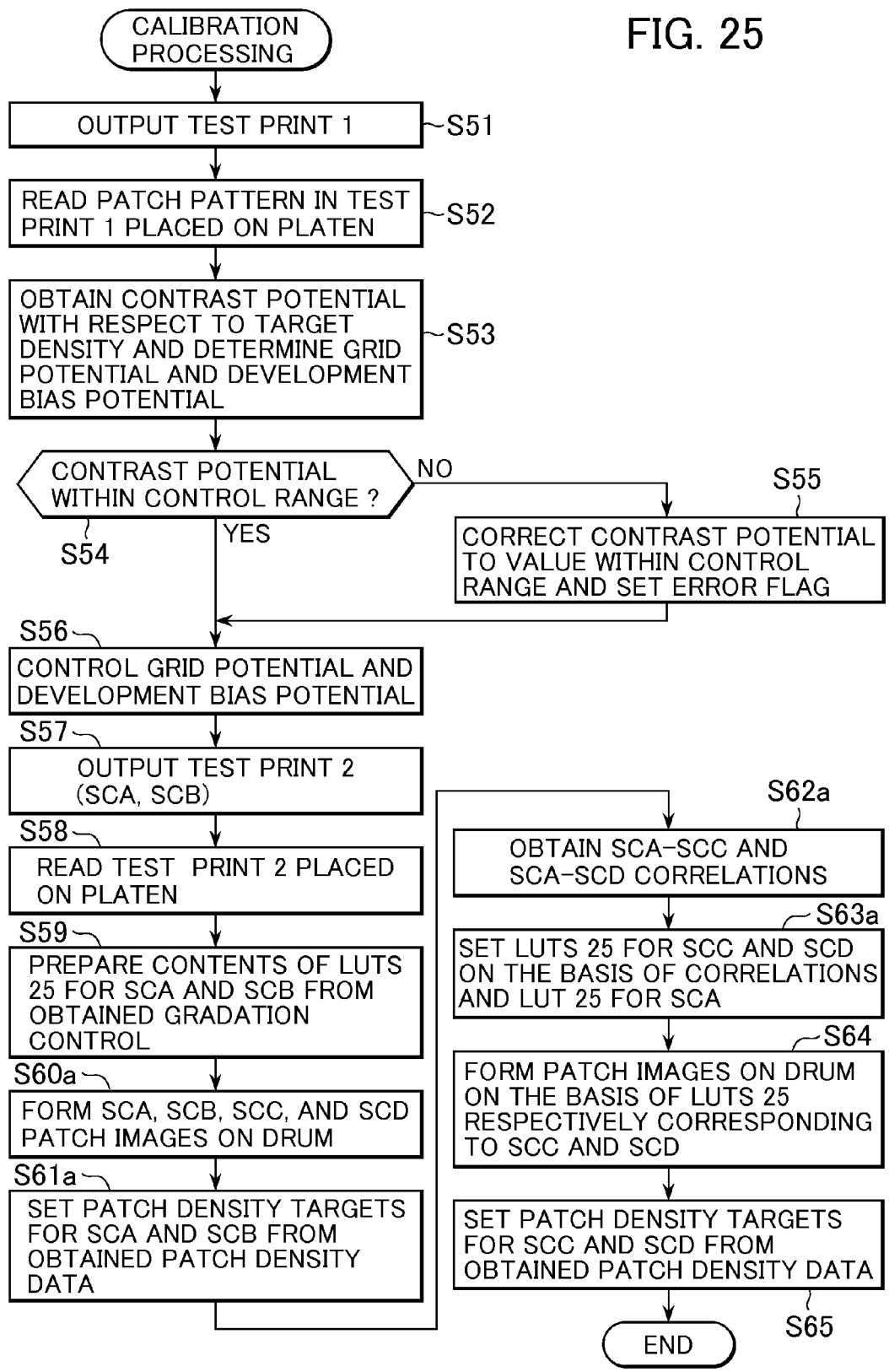
FIG. 25 is a flowchart showing a procedure for calibration process executed by image forming apparatus 100 in a second embodiment of the present invention.

A second embodiment of the present invention differs from the first embodiment in step S60 and other subsequent steps in the flowchart of FIG. 9. Steps S51 to S59 of the second embodiment are the same as those in the first embodiment, and the description thereof is therefor omitted. Another density gradation control performed by the CPU 28 will be described below with reference to FIG. 25.

In step S59, after preparing LUTs 25 for SCA and SCB, the CPU 28 forms SCA, SCB, SCC and SCD patch images on the photosensitive drum 1 (image bearing member) (step S60a).

FIG. 24 is a diagram showing patch images formed on the photosensitive drum 1 in two image forming modes SCA and SCB. The similar patch images for SCC and SCD are also formed on the photosensitive drum 1. SCA and SCB patch images through 10 levels from a highlight density to a dark density are newly formed on the photosensitive drum 1 on the basis of the LUTs 25. SCC and SCD patch images through 10 levels from a high light density to a dark density are newly formed on the photosensitive drum 1 on the basis of the LUTs 25 provisionally. This patch images are detected with the photosensor 40, followed by density conversion.

For the generation of the image signals for these patch images, the LUTs 25 determined by the first density gradation control are used. The densities of the patch images on the photosensitive drum 1 are detected with the photosensor 40. On the patch images corresponding to each level, 8-point sampling is performed. Upper two points and lower two points are cut off from the output, and the remaining four points are thereafter averaged, thereby stabilizing the data accuracy.

The patch images are measured with the photosensor 40, and a bias voltage reverse to that used at the time of ordinary image forming is thereafter applied in the primary transfer section to enable the toner images to be collected by the cleaning device 4 on the photosensitive drum 1 instead of being transferred from the photosensitive drum 1 onto the transfer belt 3.

The CPU 28 obtains data of the density of the SCA patch images processed on the basis of SCA mode and the SCB patch images processed on the basis of SCB mode immediately after LUT 25s for SCA and SCB is formed. Therefore, the values of the patch image data are set as SCA and SCB control target values for thereafter performing the second density gradation control (step S61a).

Subsequently, correlations between SCA and SCC/SCD are computed (step S62a). These correlations are computed on the basis of the outputs when the SCA, SCC, and SCD patch images prepared in step S60a are detected with the photosensor 40.

By the operation to this point, LUTs 25 for SCA and SCB and target values for the SCA and SCB are set and the correlations between SCA and SCC/SCD are obtained.

The CPU 28 obtains LUTs 25 for SCC and SCD on the basis of the LUT 25 for SCA and the obtained correlations (step S63a), thus forming LUTs 25 for all the four image forming modes.

Further, the CPU 28 forms SCC and SCD patch images on the photosensitive drum 1 by using the LUTs 25 corresponding to SCC and SCD (step S64). The formed patch images are detected with the photosensor and the densities of the patch images are computed to set SCC and SCD control target values for the second density gradation control (step S65), thus terminating density gradation control.

Thus, operations to form path images on the recording medium in all the image forming modes and user operations to make the reader read the optical density of the patch images in the density gradation control can be reduced as largely as possible in the above-described way. The display device 218 displays a screen such as shown in FIG. 12E. Generation of all the LUTs 25 is thus completed.

As described above, the image forming apparatus in the present embodiment computes correlations in patch images formed on the photosensitive drum in the first image processing mode and the second image processing mode, and obtains a LUT corresponding to the second processing mode on the basis of a LUT obtained by using a recording medium in correspondence with the first image processing mode and the above-described correlations. Thus, there is no need to perform the first density gradation control with respect to the second image processing mode, and the burden in the user can be reduced. Also, because processing for obtaining correlations is added to the control sequence for setting a target value after the first density gradation control, there is no need to largely change the control flow with respect to the conventional first density gradation control.

Since correlations between the image processing modes are obtained after execution of the first density gradation control, LUTs 25 respectively corresponding to the image processing modes can be prepared even in a situation where coefficients of the correlations between the image processing modes have changed due to environmental changes or changes with time.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2007-201951 filed Aug. 2, 2007, which is hereby incorporated by reference herein in its entirety.

What is claimed is:

1. An image forming apparatus comprising:
   an image processing unit having a first image processing mode and a second image processing mode different from the first image processing mode, said image processing unit processing an image data by said first image processing mode or said second image processing mode;
   a image forming unit adapted to form a toner image on an image bearing member and form an image on a recording medium by transferring said toner image on the image bearing member on the basis of said image data processed by the image processing unit;
   a density detection unit adapted to detect a density of said image formed on a recording medium;
   a storage unit adapted to store in advance a correlation between a density of said image on said recording medium on the basis of said image data processed by said first image processing mode and a density of the image on a recording medium on the basis of said image data processed by said second image processing mode; and
   a controller adapted to obtain a first correction parameter to correct a density of an image obtained by the first image processing mode on the basis of a result of the detection of said density detection unit and obtain a second correction parameter to correct a density of an image obtained by the second image processing mode on the basis of said first correction parameter and said correlation.

2. The image forming apparatus according to claim 1, wherein said controller obtains, as the first correction parameter, a first correction table for correcting a γ-characteristic corresponding to the first image processing mode on the basis of the result of detection by said density detection unit, and obtains, as the second correction parameter, a second correction table for correcting a γ-characteristic corresponding to the second image processing mode on the basis of the first correction table and the correlation, and said image forming unit forms a toner image on the image bearing member on the basis of image data corrected by the first correction table or the second correction table.

3. The image forming apparatus according to claim 1, wherein said density detection unit is a reader adapted to read an original.

4. The image forming apparatus according to claim 1, wherein said density detection unit is a color sensor provided downstream of said image forming unit in the recording medium transport direction and provided at a position opposed to the image formed on the recording medium for control of density gradations.

5. An image forming apparatus comprising:
   an image processing unit having a first image processing mode and a second image processing mode different from the first image processing mode, said image processing unit processing an image data by said first image processing mode or said second image processing mode;
   an image forming unit adapted to form a toner image on an image bearing member and form an image on recording medium by transferring said toner image on the image bearing member on the basis of said image data processed by the image processing unit;
   a first density detection unit adapted to detect a density of said toner image formed on the image bearing member;
   a second density detection unit adapted to detect a density of said image formed on said recording medium; and
   a controller adapted to obtain a first correction parameter to correct a density of an image processed by the first image processing mode on the basis of a result of the detection of the second density detection unit, wherein the controller is a adopted to detect a correlation between a density of a toner image on the image bearing member on the basis of said image data processed by the first image processing mode and a density of a toner image on the image bearing member on the basis of said image data processed by the second image processing mode and obtain a second correction parameter to correct a density of an image obtained by the second image processing mode on the basis of said first correction parameter and said correlation.

6. The image forming apparatus according to claim 5, wherein said controller obtains, as the first correction parameter, a first correction table for correcting a γ-characteristic corresponding to the first image processing mode on the basis of the result of detection by said second density detection unit, and obtains, as the second correction parameter, a second correction table for correcting a γ-characteristic corresponding to the second image processing mode on the basis of the first correction table and the correlation, and said image forming unit forms a toner image on the image bearing member on the basis of image data corrected by the first correction table or the second correction table.

7. The image forming apparatus according to claim 5, wherein said second density detection unit is a reader adapted to read an original.

8. The image forming apparatus according to claim 5, wherein said second density detection unit is a color sensor provided downstream of said image forming unit in the recording medium transport direction and provided at a position opposed to the image formed on the recording medium for control of density gradations.

9. An image density control method for an image forming apparatus having an image processing unit which has a first image processing mode and a second image processing mode different from the first image processing mode, and forming an image on a recording medium on the basis of the data processed by the image processing unit, and in which a correlation between the density of an image formed on the recording medium in the first image processing mode and the density of an image formed on the recording medium in the second image processing mode is stored in advance, the image density control method comprising:

an image forming step of forming an image for controlling density gradations on the recording medium in the first image processing mode;

a first correction step of detecting a density of the image on the recording medium with a density detection unit and preparing a first correction parameter corresponding to the first image processing mode on the basis of a detection result of the density detection unit; and a second correction step of preparing a second correction parameter corresponding to the second image processing mode on the basis of the first correction parameter and the correlation.

10. The image density control method according to claim 9, wherein the first correction parameter is a first correction table for correcting a γ-characteristic corresponding to the first image processing mode on the basis of the result of detection by the density detection unit, and the second correction parameter is a second correction table for correcting a γ-characteristic corresponding to the second image processing mode on the basis of the first correction table and the correlation.

11. An image density control method for an image forming apparatus having an image processing unit which has a first image processing mode and a second image processing mode different from the first image processing mode, and forming an image on a recording medium on the basis of the data processed by the image processing unit, the image density control method comprising:

an image forming step of forming an image for controlling density gradations on the recording medium in the first image processing mode;

a first correction step of detecting a density of the image on the recording medium with a first density detection unit and preparing a first correction parameter corresponding to the first image processing mode on the basis of a detection result of the first density detection unit;

a toner image forming step of forming toner images on the image bearing member on the basis of image data image-processed in the first image processing mode and image data image-processed in the second image processing mode respectively;

a processing step of detecting, with a second density detection unit, the toner images prepared in said toner image forming step, and obtaining a correlation between a result of detection, by the second density detection unit, of the toner image formed in the first image processing mode and a result of detection of the toner image formed in the second image processing mode; and a second correction step of preparing a second correction parameter corresponding to the second image processing mode on the basis of the first correction parameter and the correlation.

12. The image density control method according to claim 11, wherein the first correction parameter is a first correction table for correcting a γ-characteristic corresponding to the first image processing mode on the basis of the result of detection by the density detection unit, and the second correction parameter is a second correction table for correcting a γ-characteristic corresponding to the second image processing mode on the basis of the first correction table and the correlation.

* * * * *